United States Patent
Sorice et al.

(10) Patent No.: US 12,312,852 B2
(45) Date of Patent: *May 27, 2025

(54) DOOR ASSEMBLY WITH HIGH AND LOW VOLTAGE ELECTRICAL POWER SUPPLIES FOR INTEGRATED ELECTRIC DEVICES AND METHODS OF OPERATING THE DOOR

(71) Applicant: Masonite Corporation, Tampa, FL (US)

(72) Inventors: Cory J. Sorice, La Grange, IL (US); Steven B. Swartzmiller, Batavia, IL (US); Alex Bodurka, Portage, IL (US)

(73) Assignee: Masonite Corporation, Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/418,749

(22) Filed: Jan. 22, 2024

(65) Prior Publication Data

US 2024/0301739 A1    Sep. 12, 2024

Related U.S. Application Data

(63) Continuation of application No. 17/142,454, filed on Jan. 6, 2021, now Pat. No. 11,879,285.

(Continued)

(51) Int. Cl.
*E05F 13/00* (2006.01)
*E05F 15/40* (2015.01)
*E05F 15/611* (2015.01)

(52) U.S. Cl.
CPC ............ *E05F 15/611* (2015.01); *E05F 15/40* (2015.01); *E05Y 2201/41* (2013.01);
(Continued)

(58) Field of Classification Search
CPC ......... E05F 15/611; E05F 15/40; E05F 15/42; E05F 15/00; E05Y 2400/12; E05Y 2400/654; E05Y 2900/132
See application file for complete search history.

(56) References Cited

U.S. PATENT DOCUMENTS

| 612,192 A | 10/1898 | Chandler |
|---|---|---|
| 615,209 A | 11/1898 | Baxter |

(Continued)

FOREIGN PATENT DOCUMENTS

| AU | 2020101466 A4 | 8/2020 |
|---|---|---|
| CN | 200968110 Y | 10/2007 |

(Continued)

OTHER PUBLICATIONS

International Search Report and Written Opinion Issued in International Application No. PCT/US2021/012280 mailed Feb. 22, 2021, 10 Pages.

(Continued)

*Primary Examiner* — Chi Q Nguyen
(74) *Attorney, Agent, or Firm* — IceMiller LLP

(57) ABSTRACT

A door system comprises a door frame adapted to be mounted within an opening, a door pivotally attached to the door frame, a power converter such as an AC/DC converter operably associated the door frame, and a DC electric device mounted to the door and electrically connected to the AC/DC converter. The AC/DC converter is configured to be electrically connected to an AC power unit operably associated with the door system.

16 Claims, 13 Drawing Sheets

Related U.S. Application Data

(60) Provisional application No. 63/087,520, filed on Oct. 5, 2020, provisional application No. 63/064,045, filed on Aug. 11, 2020, provisional application No. 62/957,413, filed on Jan. 6, 2020.

(52) U.S. Cl.
CPC ... *E05Y 2400/612* (2013.01); *E05Y 2400/654* (2013.01); *E05Y 2900/132* (2013.01)

(56) References Cited

U.S. PATENT DOCUMENTS

| | | | |
|---|---|---|---|
| 1,744,040 A | 1/1930 | Elzer | |
| 3,355,695 A | 11/1967 | Overesch | |
| 3,838,234 A | 9/1974 | Peterson | |
| 3,842,386 A | 10/1974 | Suska | |
| 3,848,361 A | 11/1974 | Foster et al. | |
| 3,857,625 A | 12/1974 | Crane et al. | |
| 3,860,312 A | 1/1975 | Gordon, Jr. | |
| 4,445,299 A | 5/1984 | Lehikoinen et al. | |
| 5,375,374 A | 12/1994 | Rohroff, Sr. | |
| 5,943,888 A | 8/1999 | Lawson | |
| 6,053,676 A | 4/2000 | Garschagen et al. | |
| 6,350,956 B1 | 2/2002 | Sakata | |
| 6,812,407 B1 | 11/2004 | Opperman | |
| 7,696,858 B2 | 4/2010 | Groff | |
| 7,824,200 B2 | 11/2010 | Bryla et al. | |
| 8,156,671 B2 | 4/2012 | Presley et al. | |
| 8,169,169 B2 | 5/2012 | Hass et al. | |
| 8,225,458 B1 | 7/2012 | Hoffberg | |
| 8,337,039 B1 | 12/2012 | Larkin | |
| 8,354,914 B2 | 1/2013 | Buckingham et al. | |
| 8,359,790 B2 | 1/2013 | Shin | |
| 8,448,382 B2 | 5/2013 | Rodgers et al. | |
| 8,505,169 B2 | 8/2013 | Wood et al. | |
| 8,772,970 B2 | 7/2014 | Lambrou | |
| 9,003,705 B1 * | 4/2015 | Solowiej | E06B 7/32 49/169 |
| 9,290,966 B2 | 3/2016 | Hanchett, Jr. | |
| 9,652,917 B2 | 5/2017 | Johnson et al. | |
| 9,704,320 B2 | 7/2017 | Johnson et al. | |
| 9,825,443 B2 | 11/2017 | Shah et al. | |
| 9,869,117 B2 | 1/2018 | Houser et al. | |
| 9,915,083 B2 * | 3/2018 | Ford | E05F 15/70 |
| 9,922,513 B1 | 3/2018 | Hall et al. | |
| 10,037,636 B2 | 7/2018 | Ho et al. | |
| 10,043,332 B2 | 8/2018 | Scalisi et al. | |
| 10,361,880 B1 | 7/2019 | Marcinkowski et al. | |
| 10,453,280 B2 | 10/2019 | Kontturi | |
| 10,472,873 B2 * | 11/2019 | Ladha | E05F 3/102 |
| 10,480,231 B2 * | 11/2019 | Giese | E05D 13/003 |
| 10,487,551 B2 | 11/2019 | Soloski et al. | |
| 10,662,684 B1 * | 5/2020 | Miller | E05C 17/003 |
| 10,664,688 B2 | 5/2020 | Goulden et al. | |
| 10,691,953 B2 | 6/2020 | Johnson et al. | |
| 10,733,823 B2 | 8/2020 | Scalisi | |
| 10,755,509 B2 | 8/2020 | Saeedi et al. | |
| 10,803,685 B2 | 10/2020 | Marcinkowski et al. | |
| 10,818,118 B2 | 10/2020 | Sivalingam et al. | |
| 10,938,250 B2 | 3/2021 | Ahmed et al. | |
| 10,950,076 B1 | 3/2021 | Hall et al. | |
| 10,964,138 B2 | 3/2021 | Geerlings et al. | |
| 10,997,547 B2 | 5/2021 | Hall et al. | |
| 10,999,092 B2 | 5/2021 | Marcinkowski et al. | |
| 11,174,666 B2 | 11/2021 | Demele et al. | |
| 11,225,819 B2 * | 1/2022 | Oakley | E05F 15/63 |
| 11,244,523 B1 | 2/2022 | Brady et al. | |
| 11,248,410 B2 | 2/2022 | Dreyer et al. | |
| 11,290,298 B2 | 3/2022 | Marcinkowski et al. | |
| 11,339,604 B2 | 5/2022 | Dreyer | |
| 11,346,141 B2 | 5/2022 | Gregoriou | |
| 11,346,150 B1 | 5/2022 | Johnston | |
| 11,352,812 B2 | 6/2022 | Johnson | |
| 11,373,471 B2 | 6/2022 | Anderson et al. | |
| D957,688 S | 7/2022 | Kim et al. | |
| 11,388,373 B2 | 7/2022 | Scalisi | |
| 11,403,899 B2 | 8/2022 | Zhang | |
| 11,403,902 B2 | 8/2022 | Ho et al. | |
| 11,417,200 B2 | 8/2022 | Hass et al. | |
| 11,441,332 B2 | 9/2022 | Johnson et al. | |
| 11,532,192 B2 | 12/2022 | Hass et al. | |
| 11,536,078 B2 | 12/2022 | Dreyer | |
| 11,539,794 B1 | 12/2022 | Weber et al. | |
| 11,543,801 B2 | 1/2023 | Hall et al. | |
| 11,655,669 B2 | 5/2023 | Hutton et al. | |
| 11,694,287 B2 | 7/2023 | Marcinkowski et al. | |
| 11,729,014 B2 | 8/2023 | Marcinkowski et al. | |
| 11,767,710 B1 | 9/2023 | Johnston | |
| 11,879,285 B2 * | 1/2024 | Sorice | E05F 15/611 |
| 2001/0010493 A1 | 8/2001 | Script et al. | |
| 2003/0167693 A1 | 9/2003 | Mainini | |
| 2006/0243762 A1 | 11/2006 | Sassoon | |
| 2010/0115853 A1 | 5/2010 | Gebhart et al. | |
| 2010/0243314 A1 | 9/2010 | Bryla et al. | |
| 2012/0073083 A1 | 3/2012 | Staude | |
| 2012/0204490 A1 | 8/2012 | Lanigan et al. | |
| 2013/0212948 A1 | 8/2013 | Nixon | |
| 2014/0001880 A1 | 1/2014 | Herglotz et al. | |
| 2014/0020295 A1 | 1/2014 | Bonahoom et al. | |
| 2014/0213073 A1 | 7/2014 | Harvey | |
| 2014/0267739 A1 | 9/2014 | Ibsies | |
| 2016/0163139 A1 | 6/2016 | Kankkunen et al. | |
| 2016/0231715 A1 | 8/2016 | Dumais | |
| 2016/0322847 A1 | 11/2016 | Geiszler | |
| 2017/0040827 A1 | 2/2017 | Weber | |
| 2017/0306674 A1 | 10/2017 | Soloski et al. | |
| 2017/0358952 A1 | 12/2017 | Butler et al. | |
| 2019/0271186 A1 | 9/2019 | Chen et al. | |
| 2019/0333302 A1 | 10/2019 | Kagnew et al. | |
| 2020/0014552 A1 | 1/2020 | Tan et al. | |
| 2020/0082240 A1 | 3/2020 | Heitmar | |
| 2020/0349786 A1 | 11/2020 | Ho et al. | |
| 2020/0378172 A1 | 12/2020 | Lerpard | |
| 2021/0207420 A1 | 1/2021 | Tung et al. | |
| 2021/0156184 A1 * | 5/2021 | Gayhart | E05B 65/108 |
| 2021/0207419 A1 | 7/2021 | Sorice et al. | |
| 2021/0207421 A1 | 7/2021 | Sorice et al. | |
| 2021/0209878 A1 | 7/2021 | Kim et al. | |
| 2021/0324672 A1 | 10/2021 | Altiner et al. | |
| 2021/0404237 A1 * | 12/2021 | Eccleston | E05F 15/627 |
| 2022/0155005 A1 | 5/2022 | Lee et al. | |
| 2022/0186543 A1 | 6/2022 | Soderqvist | |
| 2022/0263297 A1 | 8/2022 | Bodurka et al. | |
| 2022/0351722 A1 | 11/2022 | Mandry et al. | |
| 2022/0392287 A1 | 12/2022 | Shen | |
| 2023/0062621 A1 | 3/2023 | Cheung | |
| 2023/0184022 A1 | 6/2023 | Eliasson et al. | |

FOREIGN PATENT DOCUMENTS

| | | |
|---|---|---|
| CN | 103606213 A | 2/2014 |
| CN | 104105248 A | 10/2014 |
| CN | 203925102 U | 11/2014 |
| CN | 205117039 U | 3/2016 |
| CN | 106761274 A | 5/2017 |
| CN | 106836990 A | 6/2017 |
| CN | 206309153 U | 7/2017 |
| CN | 206329255 U | 7/2017 |
| CN | 107191110 A | 9/2017 |
| CN | 107448128 A | 12/2017 |
| CN | 107575137 A | 1/2018 |
| CN | 107610390 A | 1/2018 |
| CN | 107643706 A | 1/2018 |
| CN | 206903524 U | 1/2018 |
| CN | 107705511 A | 2/2018 |
| CN | 107730687 A | 2/2018 |
| CN | 107747457 A | 3/2018 |
| CN | 107795255 A | 3/2018 |
| CN | 107829659 A | 3/2018 |
| CN | 108118987 A | 6/2018 |
| CN | 207458156 U | 6/2018 |
| CN | 108389290 A | 8/2018 |
| CN | 108399674 A | 8/2018 |

(56) References Cited

FOREIGN PATENT DOCUMENTS

| | | |
|---|---|---|
| CN | 108412359 A | 8/2018 |
| CN | 108442852 A | 8/2018 |
| CN | 108661486 A | 10/2018 |
| CN | 108756617 A | 11/2018 |
| CN | 108868508 A | 11/2018 |
| CN | 108915498 A | 11/2018 |
| CN | 108924015 A | 11/2018 |
| CN | 108952449 A | 12/2018 |
| CN | 109098543 A | 12/2018 |
| CN | 109138774 A | 1/2019 |
| CN | 109191617 A | 1/2019 |
| CN | 109191739 A | 1/2019 |
| CN | 109236134 A | 1/2019 |
| CN | 109236135 A | 1/2019 |
| CN | 109267837 A | 1/2019 |
| CN | 109472902 A | 3/2019 |
| CN | 208777869 U | 4/2019 |
| CN | 110009782 A | 7/2019 |
| CN | 110165758 A | 8/2019 |
| CN | 110264682 A | 9/2019 |
| CN | 209429913 U | 9/2019 |
| CN | 110409954 A | 11/2019 |
| CN | 110505182 A | 11/2019 |
| CN | 110531631 A | 12/2019 |
| CN | 209990389 U | 1/2020 |
| CN | 110778265 A | 2/2020 |
| CN | 111173404 A | 5/2020 |
| CN | 111270959 A | 6/2020 |
| CN | 111343432 A | 6/2020 |
| CN | 111441680 A | 7/2020 |
| CN | 211038390 U | 7/2020 |
| CN | 211124167 U | 7/2020 |
| CN | 111505947 A | 8/2020 |
| CN | 111540093 A | 8/2020 |
| CN | 111653025 A | 9/2020 |
| CN | 111764747 A | 10/2020 |
| CN | 211851423 U | 11/2020 |
| CN | 112096221 A | 12/2020 |
| CN | 112211496 A | 1/2021 |
| CN | 112267796 A | 1/2021 |
| CN | 112330869 A | 2/2021 |
| CN | 112491668 A | 3/2021 |
| CN | 112539020 A | 3/2021 |
| CN | 213205374 U | 5/2021 |
| CN | 112901047 A | 6/2021 |
| CN | 113048374 A | 6/2021 |
| CN | 113129476 A | 7/2021 |
| CN | 113338772 A | 9/2021 |
| CN | 113345130 A | 9/2021 |
| CN | 113545639 A | 10/2021 |
| CN | 113645446 A | 11/2021 |
| CN | 113674454 A | 11/2021 |
| CN | 113706744 A | 11/2021 |
| CN | 214835862 U | 11/2021 |
| CN | 214886488 U | 11/2021 |
| CN | 214943492 U | 11/2021 |
| CN | 215169563 U | 12/2021 |
| CN | 113947834 A | 1/2022 |
| CN | 217240775 U | 8/2022 |
| CN | 217307315 U | 8/2022 |
| CN | 115095246 A | 9/2022 |
| CN | 115164381 A | 10/2022 |
| CN | 115235096 A | 10/2022 |
| CN | 115294675 A | 11/2022 |
| CN | 115324428 A | 11/2022 |
| CN | 115341821 A | 11/2022 |
| CN | 115393988 A | 11/2022 |
| CN | 218454661 U | 2/2023 |
| CN | 115798084 A | 3/2023 |
| CN | 116251221 A | 6/2023 |
| CN | 219197192 U | 6/2023 |
| CN | 219246122 U | 6/2023 |
| CN | 116498183 A | 7/2023 |
| CN | 116760602 A | 9/2023 |
| CN | 117238059 A | 12/2023 |
| DE | 602004012391 T2 | 3/2009 |
| DE | 102008031155 A1 | 1/2010 |
| DE | 202022101334 U1 | 5/2022 |
| EP | 3118405 A1 | 1/2017 |
| EP | 3537398 A1 | 9/2019 |
| EP | 3845729 A1 | 7/2021 |
| FR | 3132160 A3 | 7/2023 |
| IN | 201921017138 A | 5/2019 |
| IN | 201911049967 A | 12/2019 |
| IN | 201911048995 A | 5/2021 |
| IN | 202111053824 A | 12/2021 |
| IN | 202241020116 A | 4/2022 |
| IN | 202241026843 A | 5/2022 |
| IN | 411059 B | 11/2022 |
| IN | 202111013824 A | 12/2022 |
| IN | 430120 B | 4/2023 |
| IN | 202341019331 A | 4/2023 |
| JP | 2013217129 A | 10/2013 |
| JP | 6680821 B2 | 3/2020 |
| JP | 2020042440 A | 3/2020 |
| JP | 6777955 B2 | 10/2020 |
| KR | 20160025226 A | 3/2016 |
| KR | 20160050965 A | 5/2016 |
| KR | 20160123639 A | 10/2016 |
| KR | 20160124481 A | 10/2016 |
| KR | 101800514 B1 | 12/2017 |
| KR | 20180076537 A | 7/2018 |
| KR | 20180131716 A | 12/2018 |
| KR | 101988851 B1 | 6/2019 |
| KR | 20190098719 A | 8/2019 |
| KR | 20190098720 A | 8/2019 |
| KR | 102024754 B1 | 9/2019 |
| KR | 102079532 B1 | 2/2020 |
| KR | 102150642 B1 | 9/2020 |
| KR | 20200143302 A | 12/2020 |
| KR | 20210004253 A | 1/2021 |
| KR | 20210016726 A | 2/2021 |
| KR | 20210019211 A | 2/2021 |
| KR | 20210019216 A | 2/2021 |
| KR | 20210019218 A | 2/2021 |
| KR | 20210019241 A | 2/2021 |
| KR | 20210045195 A | 4/2021 |
| KR | 20210072510 A | 6/2021 |
| KR | 20210078199 A | 6/2021 |
| KR | 102303254 B1 | 9/2021 |
| KR | 102329035 B1 | 11/2021 |
| KR | 102341883 B1 | 12/2021 |
| KR | 20210153308 A | 12/2021 |
| KR | 20220031428 A | 3/2022 |
| KR | 102421708 B1 | 7/2022 |
| KR | 20220113136 A | 8/2022 |
| KR | 20220119878 A | 8/2022 |
| KR | 102472384 B1 | 12/2022 |
| KR | 102534826 B1 | 5/2023 |
| TW | M627626 U | 6/2022 |
| WO | 2013163124 A1 | 10/2013 |
| WO | 2016032464 A1 | 3/2016 |
| WO | 2016175910 A1 | 11/2016 |
| WO | 2017024088 A1 | 2/2017 |
| WO | 2018184450 A1 | 10/2018 |
| WO | 2018184452 A1 | 10/2018 |
| WO | 2018184453 A1 | 10/2018 |
| WO | 2018184454 A1 | 10/2018 |
| WO | 2019068021 A1 | 4/2019 |
| WO | 2019162435 A1 | 8/2019 |
| WO | 2021247909 A1 | 12/2021 |
| WO | 2022004989 A1 | 1/2022 |
| WO | 2022010071 A1 | 1/2022 |
| WO | 2022010072 A1 | 1/2022 |
| WO | 2022010073 A1 | 1/2022 |
| WO | 2022010074 A1 | 1/2022 |
| WO | 2022020893 A1 | 2/2022 |
| WO | 2022145966 A1 | 7/2022 |

(56) References Cited

FOREIGN PATENT DOCUMENTS

| | | |
|---|---|---|
| WO | 2022263147 A1 | 12/2022 |
| WO | 2023180427 A1 | 9/2023 |

OTHER PUBLICATIONS

Chilean Office Action Issued in Chilean Application No. 202201820 dated Sep. 1, 2023, 15 Pages.
Chilean Office Action for Chilean Application No. 2022-01820; Report Mail Date Dec. 5, 2024 (6 Pages with Translation).

* cited by examiner

DOOR ASSEMBLY WITH HIGH AND LOW VOLTAGE ELECTRICAL POWER SUPPLIES FOR INTEGRATED ELECTRIC DEVICES AND METHODS OF OPERATING THE DOOR

CROSS-REFERENCE TO RELATED APPLICATION AND CLAIM TO PRIORITY

This application is a continuation of U.S. application Ser. No. 17/142,454 filed Jan. 6, 2021, now U.S. Pat. No. 11,874,285, which claims the benefit of U.S. Provisional Patent Application Ser. No. 62/957,413 filed Jan. 6, 2020, Ser. No. 63/064,045 filed Aug. 11, 2020 and Ser. No. 63/087,520 filed Oct. 5, 2020, all by Sorice et al., which are each hereby incorporated herein by reference in its entirety and to which priority is claimed.

BACKGROUND OF THE INVENTION

1. Field of the Invention

The present invention is directed to exterior or interior doors for residential or commercial buildings, such as for a home, apartment, condominium, hotel room or business, and more particularly to a door assembly provided with sources of low- and/or high-voltage electrical power in order to provide power that may be used to operate electric devices mounted to the door assembly. The invention is also directed to methods of operating the door.

2. Description of the Related Art

Typical existing exterior or interior doors for residential or commercial buildings may have a number of electric devices (or components) mounted to the doors in order to provide desired functions, such as electronic access control, door state feedback, an entry camera and audio communication, an electric powered door latch, an electric powered door lock, etc. Also, the market for exterior and interior doors has seen an increasing adoption of additional electric devices including video doorbells, smart locks, LED lighting, smart glass, electromechanical door closers, wireless connectivity electronics, etc. Each of these discrete electric devices is an add-on to an existing door, functions with the existing door construction, and is powered separately with at least one battery that requires periodic replacement. Should the battery not be replaced, then the electric device will not operate.

Current electric devices are mounted to exterior or interior doors in a manner that can be unattractive and unpleasant to look at. The electric devices typically each have either one or more rechargeable battery packs or at least one non-rechargeable battery that must periodically be recharged or changed and have some type of weatherable housing that may not match the appearance of the door.

While the commercial market, e.g., multi-tenant and mixed-use housing, hospitality, office, etc., has developed electrified door entry systems with electric strikes and door controller technologies, the adoption into the residential market has been limited. Existing residential door construction techniques focus on stile and rail construction, and have not seen integration of power systems or integration of electric devices.

Therefore, the need exists for a door and methods of operation designed for integration of electric devices into the door, with power run to the door so electric devices may be easily integrated into and powered from a central power supply without adversely impacting structural integrity, insulation and/or acoustic performance, energy efficiency, and aesthetics of the door. Thus, improvements that may enhance performance and cost of door assemblies with electric devices are possible.

BRIEF SUMMARY OF THE INVENTION

According to a first aspect of the present invention, there is provided a door system. The door system comprises a door frame adapted to be mounted within an opening, a door pivotally attached to the door frame, a power converter such as an AC/DC converter operably associated the door frame, and a DC electric device mounted to the door and electrically connected to the AC/DC converter. The AC/DC converter is configured to be electrically connected to an AC power unit operably associated with the door system.

According to a second aspect of the present invention, there is provided an entry system. The entry system comprises a door frame mounted within an entryway, a door pivotally attached to the door frame, a power converter such as an AC/DC converter operably associated with the door frame, an AC power unit operably associated with the door frame and electrically connected to the AC/DC converter, a DC power distribution system operably associated with the door and/or door frame and electrically connected to the AC/DC converter, and a plurality of DC electric devices mounted to the door and/or door frame and electrically connected to the AC/DC converter through the DC power distribution system.

According to a third aspect of the present invention, there is provided a method of operating an entryway. The method of operating the entryway comprises the steps of providing a door frame within an opening, a door having an electric power operating mechanism pivotally mounted to the door frame, positioning a source of AC power proximate the door frame, altering the supplied AC power such as by generating DC power by rectifying and reducing the voltage of the AC power, and supplying low-voltage DC power to the door, positioning at least one DC electric device on the door, and operating the DC electric device.

Other aspects of the invention, including apparatus, devices, methods, and the like which constitute parts of the invention, will become more apparent upon reading the following detailed description of the exemplary embodiments.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. In such drawings.

DETAILED DESCRIPTION OF EXEMPLARY EMBODIMENTS

Figure 1:
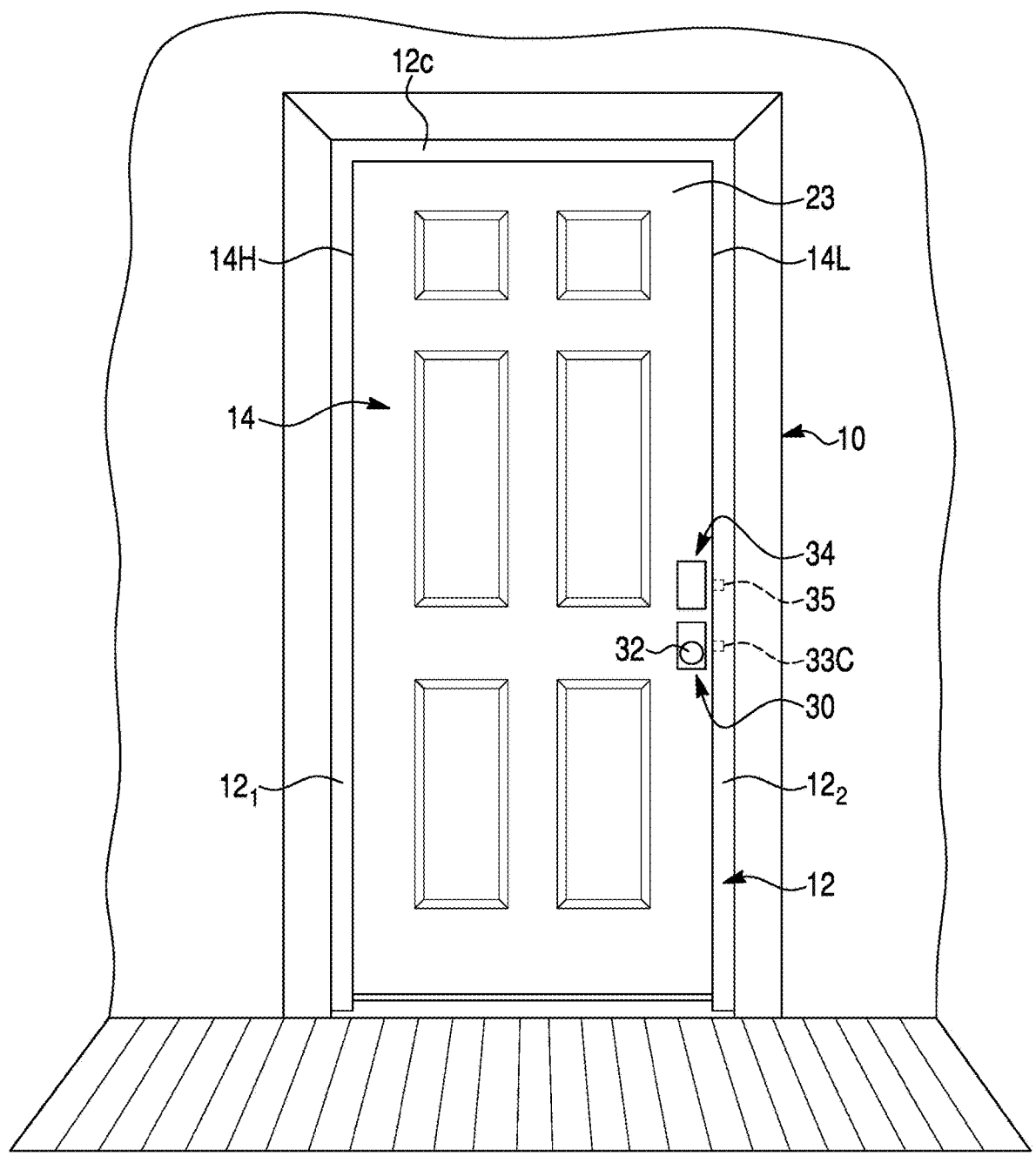
FIG. 1 is an elevational exterior view of an exterior door system according to a first exemplary embodiment of the present invention.

Reference will now be made in detail to the exemplary embodiments and exemplary methods as illustrated in the accompanying drawings, in which like reference characters designate like or corresponding parts throughout the drawings. It should be noted, however, that the invention in its broader aspects is not necessarily limited to the specific details, representative materials and methods, and illustrative examples shown and described in connection with the exemplary embodiments and exemplary methods.

This description of exemplary embodiments is intended to be read in connection with the accompanying drawings, which are to be considered part of the entire written description. In the description, relative terms such as "horizontal," "vertical," "front," "rear," "upper", "lower", "top" and "bottom" as well as derivatives thereof (e.g., "horizontally," "downwardly," "upwardly," etc.) should be construed to refer to the orientation as then described or as shown in the drawing figure under discussion and to the orientation relative to a vehicle body. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. The term "integral" (or "unitary") relates to a part made as a single part, or a part made of separate components fixedly (i.e., non-moveably) connected together. Additionally, the word "a" and "an" as used in the claims means "at least one" and the word "two" as used in the claims means "at least two".

Figure 2:
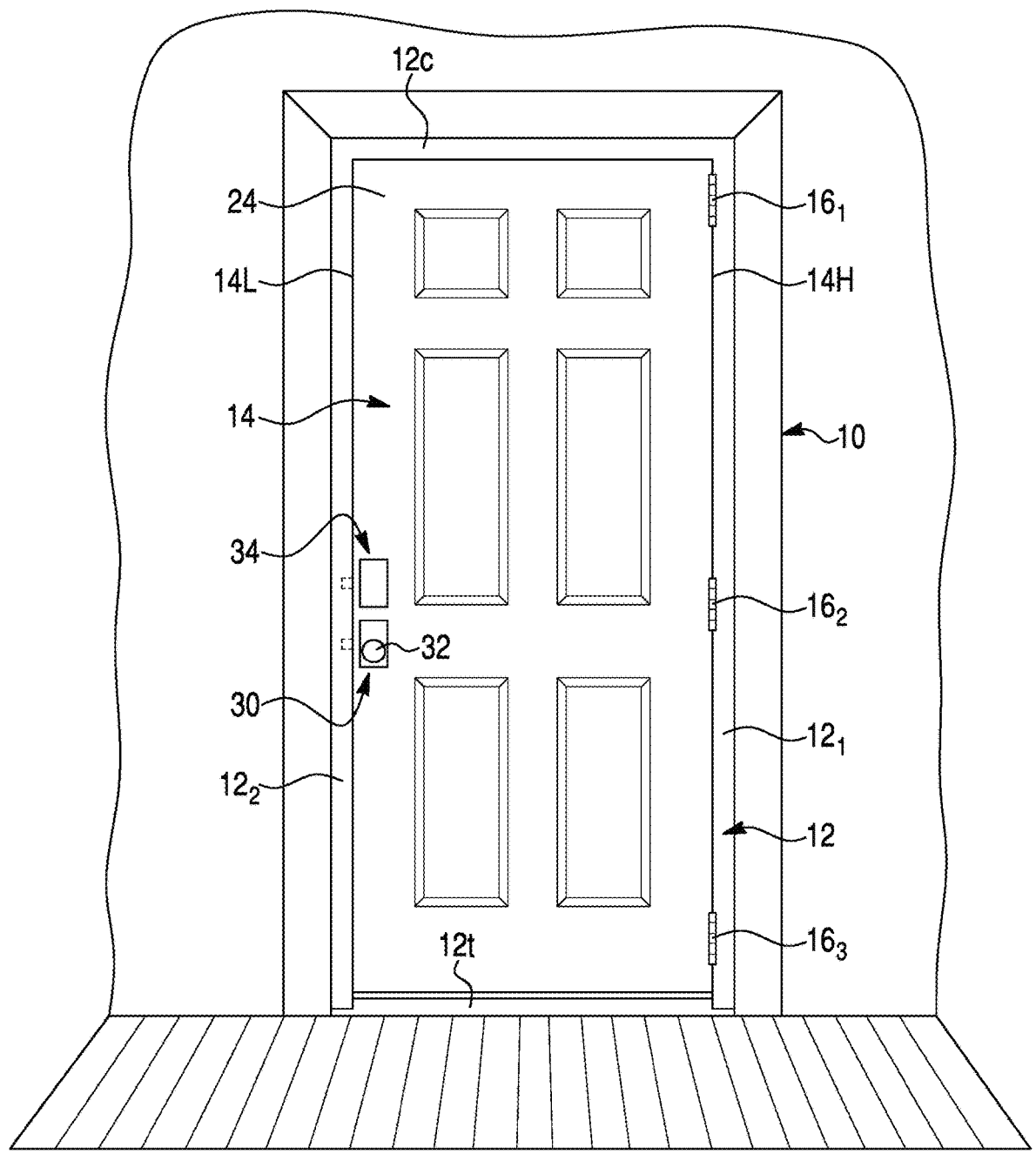
FIG. 2 is an elevational interior view of the door system according to the first exemplary embodiment of the present invention.

FIGS. 1 and 2 depict a door system 10 according to a first exemplary embodiment of the present invention, such as a pre-hung door. The door system 10 according to the present invention includes a conventional hinged residential exterior door assembly 11, but it should be understood that the door assembly 11 according to the present invention may be an exterior or interior door assembly having a pivotally connected door provided for a residential or commercial building, such as a home, apartment, garage, condominium, hotel, office building, or the like. The door assembly 11 may be made of any appropriate material, such as wood, metal, wood composite material, fiberglass reinforced polymer composite or the like. The door assembly 11 includes a substantially rectangular door frame 12 and a door 14 pivotally attached thereto by at least one hinge 16$i$, such as "butt hinge" that includes two leaves.

The door frame 12 includes first and second parallel, spaced apart vertically extending jamb members 121, 122 and a horizontally extending upper jamb rail member or header 12$c$ that connects upper ends of the first and second jamb members 12$i$, 122. Those skilled in the art recognize that lower ends of the jamb members 121, 122 may be interconnected through a threshold 12$t$.

The at least one hinge 16$i$ pivotally attaches the door 14 to the first jamb member 12$i$. Typically, at least two hinges 16$i$ and 162 are provided to secure the door 14 to the first jamb member 12$i$. Preferably, as best shown in FIG. 2, three hinges 161, 162, 163 are used to secure the door 14 to the door frame 12. In the interest of simplicity, the following discussion will sometimes use reference numeral 16 without a subscript numeral to designate an entire group of hinges. For example, the reference numeral 16 will be sometimes used when generically referring to the hinges 16$i$, 162 and 163.

The door 14 includes a rectangular inner door frame 20, an exterior door skin (or facing) 23, and an interior door skin (or facing) 24 secured to opposite sides of the inner door frame 20. The exterior and interior door skins 23 and 24 are formed separately from one another and usually are identical in appearance. The door skins 23 and 24 are secured, e.g., typically adhesively, to a suitable core and/or to opposite sides of the inner door frame 20 so that the inner door frame 20 is sandwiched between the exterior and interior door skins 23 and 24. Typically, the exterior and interior door skins 23 and 24 are made of a polymer-based composite, such as sheet molding compound ("SMC") or medium-density fiberboard (MDF), other wood composite materials, fiber-reinforced polymer, such as fiberglass, hardboard, fiberboard, steel, and other thermoplastic materials. The door 14 has a hinge side 14H mounted to the inner door frame 20 by the hinges 16, and a horizontally opposite latch side 14L.

Figure 3:
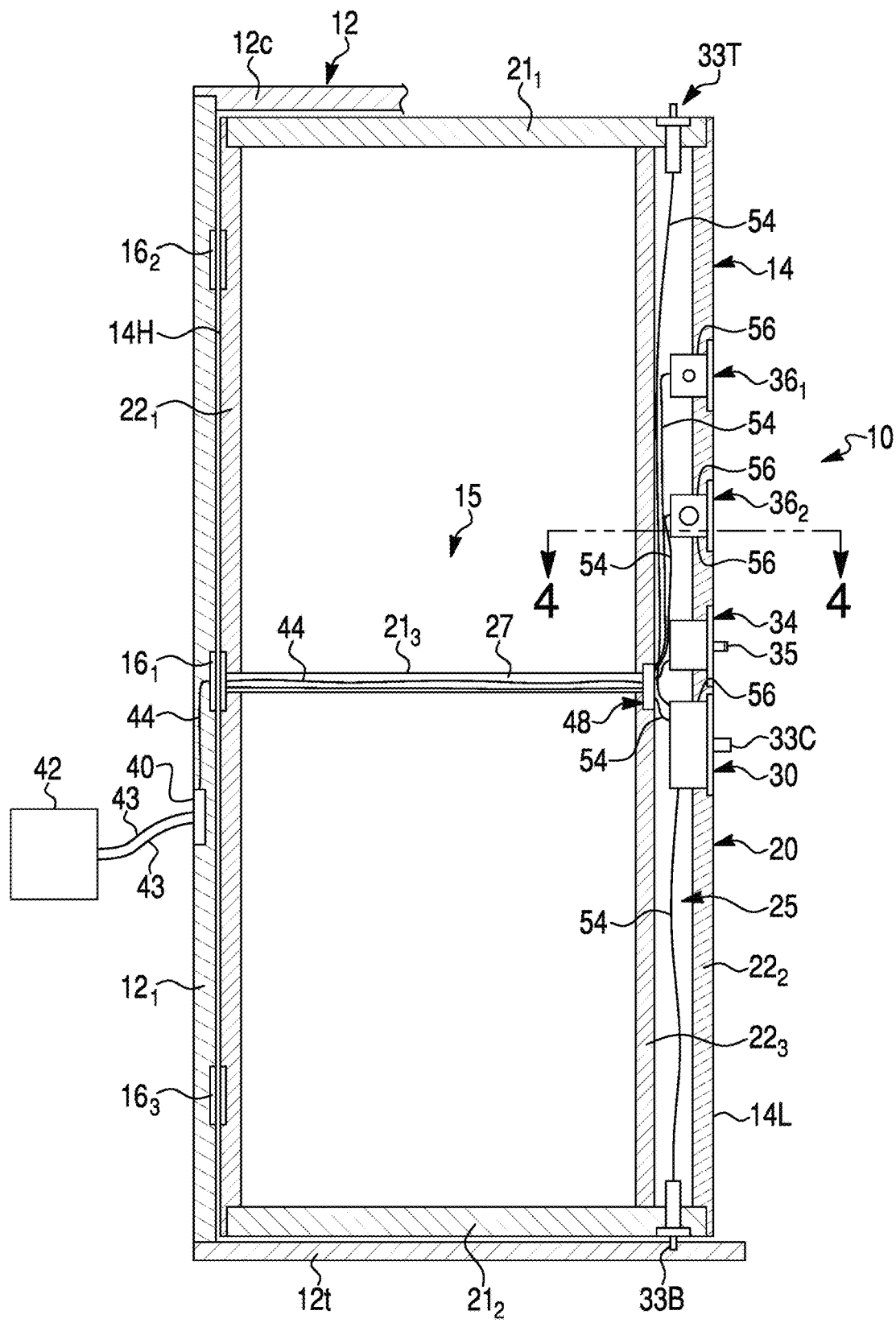
FIG. 3 is an elevational view of the door system according to the first exemplary embodiment of the present invention without an exterior door skin.
Figure 4:
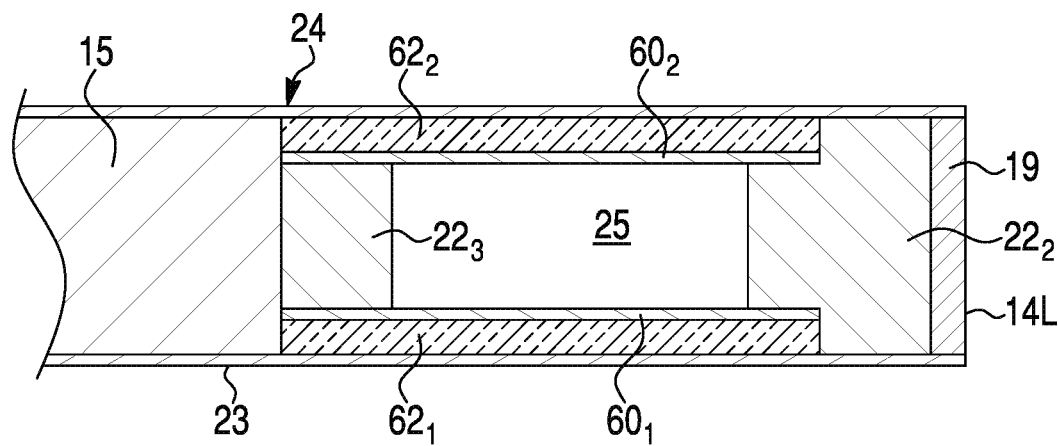
FIG. 4 is a cross-sectional view of a door according to the first exemplary embodiment taken along the lines 4-4 in FIG. 3.

The inner door frame 20 includes a pair of parallel, spaced apart horizontally extending top and bottom rails 211 and 2$h$, respectively, and a pair of parallel, spaced apart vertically extending first and second stiles 22$i$ and 222, respectively, typically manufactured from wood or an engineered wood, such as a laminated veneer lumber (LVL). The top and bottom rails 211 and 2$h$ horizontally extend between the first and second stiles 22$i$ and 222. Moreover, the top and bottom rails 211 and 2$h$ may be fixedly secured to the first and second stiles 22$i$ and 222, such as through adhesive or mechanical fasteners. The inner door frame 20 further may include a mid-rail 2$h$, best shown in FIGS. 3-5. The mid-rail 2h extends horizontally and is spaced apart from the top and bottom rails 211 and 212, respectively, and is typically also manufactured from wood or an engineered wood, such as a laminated veneer lumber (LVL). Moreover, the mid-rail 2h may be fixedly secured to the first and second stiles 22i and 222. The hinges 16 are secured to the first stile 22i, which defines a hinge stile of the inner door frame 20. The door 14 may also include a protective cap 19 made of composite material, as best shown in FIG. 4. Specifically, the protective cap 19 can be made from polyvinyl chloride or other weatherable polymer. As further illustrated in FIGS. 3 and 4, the door 14 also includes a vertically extending inner stile 223, which is adjacent to and horizontally spaced from the second stile 222 so as to define a vertical supply passage 25 therebetween. The inner stile 223 may also be manufactured from wood or an engineered wood, such as a laminated veneer lumber (LVL).

The inner door frame 20 and the exterior and interior door skins 23, 24 of a typical door surround an interior cavity, which may be hollow or may be filled with, for example, corrugated pads, foam insulation, or other core materials, if desired. Thus, the door 14 may include a core 15 disposed within the inner door frame 20 between the exterior and interior door skins 23 and 24. The core 15 may be formed from foam insulation, such as polyurethane foam material, cellulosic material and binder resin, corrugated pads, etc.

The door system 10, according to the first exemplary embodiment, comprises a number of electric components (devices) mounted to the door 14 of the door system 10 to provide functions, such as electronic access control, door state feedback, entry camera and audio/video communication, etc. Specifically, the electric devices that may be mounted to the door 14 of the door system 10 include, but are not limited to, an electric powered door latch 30, an electric powered door lock 34, a video doorbell $36_i$, and a digital camera $36_2$, as best illustrated in FIG. 3. Alternatively, the video doorbell $36_i$ and the digital camera $36_2$ may be mounted to the door frame 12 or even adjacent to the frame 12 on a wall of the building. It should be understood that the door system 10 according to the present invention may include other electric devices. In the interest of simplicity, the following discussion will sometimes use a reference numeral without a subscript numeral to designate an entire group of the electric devices. For example, the reference numeral 36 will be sometimes used when generically referring to the electric devices $36_1$ and $36_2$.

As best illustrated in FIGS. 1 and 2, the electric powered door latch 30 according to the first exemplary embodiment is a 3-point latch that includes a handle (or knob) 32, a powered central latch 33C, a powered top latch 33T and a powered bottom latch 33B. The handle 32 is manually operable by a user to retract the central latch 33C to allow opening of the door 14 from a closed position to an open position. As further illustrated in FIGS. 1 and 2, the electric powered door lock 34 is in the form of a deadbolt device, although other locking systems may be utilized. The electric door lock 34 includes a locking element in the form of a deadbolt 35 operable between an extended or locked position, which prevents opening of the door 14, and a retracted or unlocked position, which allows opening of the door 14. As best illustrated in FIGS. 1-3, the electric powered door latch 30 and the electric powered door lock 34 are mounted to the latch side 14L of the door 14. Specifically, the electric powered door latch 30 and the electric powered door lock 34 are mounted to the second stile 222, which defines a latch stile of the inner door frame 20.

As illustrated in FIG. 3, the door system 10 further comprises a low voltage (such as 5 volts (V), 12 volts, 24 volts or other required voltage) power converter, such as an AC to DC (AC/DC) converter 40 mounted to the door frame 12. Alternatively, the power converter, such as the low voltage AC/DC converter 40 may be disposed outside the door assembly 11, such as at the wall adjacent the frame 12. According to the present invention, as best illustrated in FIG. 3, the low voltage AC/DC converter 40 is located in a pocket (or slot) 41 machined or otherwise formed into the first jamb member 12i of the door frame 12 so that the low voltage AC/DC converter 40 is accessible from outside of the first jamb member 12i of and removably mounted in the pocket 41 so that it may be accessed for maintenance and replacement. The first jamb member 12i is adjacent to the hinges 16 and the first stile of the inner door frame 20, i.e., adjacent to the hinge side 14H of the door 14. The low voltage AC/DC converter 40 is electrically connected by high voltage electrical wires 43 to a 115 (or 120) V AC power unit 42 installed during home construction and located adjacent the door system 10 or installed during installation of door system 10. While we illustrate the AC/DC converter 40 as being located in or on the first jamb member 12i, it may be located elsewhere on the frame 12.

The low voltage AC/DC converter 40 can be located at a standardized height on the first jamb member 12i of the door frame 12 such as when the AC power unit 42 is installed during home construction. Due to their close proximity, the AC/DC converter 40 and AC power unit 42 may be easily electrically connected. The AC power unit 42 defines a source of high voltage (i.e., more than 45 volts, such as 120 (or 115) volts of standard general-purpose alternating-current (AC) electrical power supply or a high voltage electrical power supply) disposed outside but adjacent the door system 10. Typically, the standard 120 (or 115) volts general-purpose AC electrical power supply is known in the USA as grid power, wall power, or domestic power (also known as the effective voltage of the US standard household circuit, which is about 120 volts). Other voltages, such as 220 volts, may be used. The low voltage AC/DC converter 40 changes the standard general-purpose alternating-current (AC) high voltage of 120 V to the low voltage of 5 volts DC, 24 volts DC, or other required voltage (generally, less than 40 volts DC). Many electric devices operate at 5 volts DC or 12 volts DC, so the AC/DC converter 40 steps down the power and current type to allow typical 120 (or 115) volts general-purpose AC electrical to be available for use at the door system 10. The AC/DC converter 40 is electrically connected to the door 14 through an electric power transfer device. According to the present invention, a low voltage supply electrical wire(s) 44 runs from the low voltage AC/DC converter 40 to the electric power transfer device, such as through one of the hinges 16i, 162, 163. Specifically, the low voltage supply electrical wire 44 runs to and through the hinge 161 disposed usually in the middle of the first jamb member 12i of the door frame 12 and provides an electric powered (or electric transfer) hinge that conducts the low voltage electrical power therethrough. The low voltage supply electrical wire 44 transfers electrical power across or through the electric powered hinge 161. Exemplary electrical hinges are disclosed in U.S. Pat. Nos. 3,860,312, 3,857, 625, 3,842,386, 3,838,234, 3,355,695, 1,744,040, 615,209, 612,192 and US published patent application No. 2017/0306674, 2014/0213073, 2014/0001880, 2012/0073083, the complete disclosures of which are incorporated herein by reference.

Alternatively, an electric power transfer device, such as provided by an armored electrical cable, may be used instead of the hinges 161, 162, 163 to transfer low voltage electrical power from the door frame 12 to the pivotable door 14. The low voltage supply electrical wire(s) 44 may pass from the low voltage AC/DC converter 40 in the first jamb member 12i of the door frame 12 to the pivotable door 14 without using the electric powered hinge, i.e., bypassing any of the door hinges 161, 162, 163. Exemplary electric power transfer devices are disclosed in U.S. Pat. Nos. 3,848,361, 4,445,299, 6,350,956, 6,812,407, 8,448,382, 8,505,169 and 9,825,443, the complete disclosures of which are incorporated herein by reference. Low voltage DC power is supplied to door 14 in order to minimize the possibility of electrical shock to a user. Further, the electric devices 36 typically are battery operated and thus operate on DC current at relatively low voltages, typically 5 V DC.

The supply electrical wire(s) 44 is connected to the powered hinge 16i on the hinge side 14H of the door 14 and preferably runs through a horizontal supply channel 27 to a DC power distribution system 48, such as provided by an electrical distribution block, located in or adjacent to the vertical supply passage 25 on the latch side 14L of the door 14. The DC power distribution system 48 transmits low voltage DC power, data, electric signals, or a combination thereof. According to the first exemplary embodiment, the DC power distribution system 48 is disposed in a pocket (or slot) 49 machined or otherwise formed into the inner stile 223 of the second stile 222 of the inner door frame 20. Moreover, the vertical supply passage 25 may be accessed before the electric door latch 30 and/or the electric door lock 34 are installed. Electric power can be delivered through the vertical supply passage 25 from the DC power distribution system 48 to the electric devices 36i and 362 that are mounted to the door 14, specifically into the latch stile 222.

A plurality of connecting electrical wires 54 extend through the vertical supply passage 25 and electrically connect the DC power distribution system 48 to the electric powered door latch 30, the electric powered door lock 34, and the electric powered devices 36i and 362. Alternatively, electrical connectors may be pre-mounted in the vertical supply passage 25 at desired locations, so that the electric devices 36 may simply be inserted and plugged into or otherwise electrically connected to electrical connectors. A standard flange size and connector location relative to location of a flange of the electric devices 36 may be set so that suppliers may supply electric devices that are easily connected into the door 14. The supply electrical wire 44 and the plurality of the connecting electrical wires 54 together define an electrical wire system, which is disposed within the door 14 and is electrically connected to the AC/DC converter 40 and to the DC electric devices 30, 34 and 36.

In the event the electric devices 36 have connectors for connection to the DC power distribution system 48, the connectors may have a flange or some other unique identifier to mate with a complementary receptacle in order to identify or designate the connector and thus its electric device 36 is approved for use with the door system 10. Alternatively, the electric devices 36 may have an electronic signature or some other identifier to assure that the electric device 36 is approved for installation. A software handshake is another verification mechanism that may be utilized for electric devices 36.

The vertical supply passage 25 is formed between the second stile 222 and the inner stile 223. As further illustrated in FIG. 4, the vertical supply passage 25 is also delimited by a front inner strip 601 adjacent to the exterior door skin 23, and a rear inner strip 602 adjacent to the interior door skin 24, both made of appropriate material, such as fiberglass reinforced polymer. A space 62i between the exterior door skin 23 and the front inner strip 601 as well as a space 622 between the interior door skin 24 and the rear inner strip 602 is filled with appropriate material, such as closed-cell polystyrene foam (e.g., Styrofoam®). The layers of polystyrene foam provide thermal insulation to the vertical supply passage 25 so the door 14 will meet energy requirements. The fiberglass reinforced strips 601 and 602 provide additional structural support and a barrier between the electric devices 36 and the polystyrene foam. Alternatively, the spaces 621 and 622 may be made of higher density foam layer, thus eliminating the need for the fiberglass reinforced strips 601 and 602.

The door 14 according to the first exemplary embodiment allows easy integration of the electric devices 36, while maintaining structural, insulation, noise attenuation, and aesthetic requirements of an exterior door. Moreover, according to the first exemplary embodiment, slots (or openings) 56, such as of up to 1" in width, may be machined into the latch stile 222 to allow mounting of various electric devices, as best shown in FIG. 3. While we show slots 56 opening onto stile 222, the slots may open onto door facings 23, 24. The slots 56 open into the vertical supply passage 25. The connecting electrical wires 54 may be run to the DC power distribution system 48 or connectors may be pre-mounted to the inner stile 223 in the vertical supply passage 25, thus allowing the electric devices to be plugged-in so that electric power can be supplied for use and functioning of the electric devices. Providing electric power to the door system 10 and the door 14 minimizes the need for changing batteries, thus assuring more reliable operation and functioning of the electric devices 36.

Figure 5:
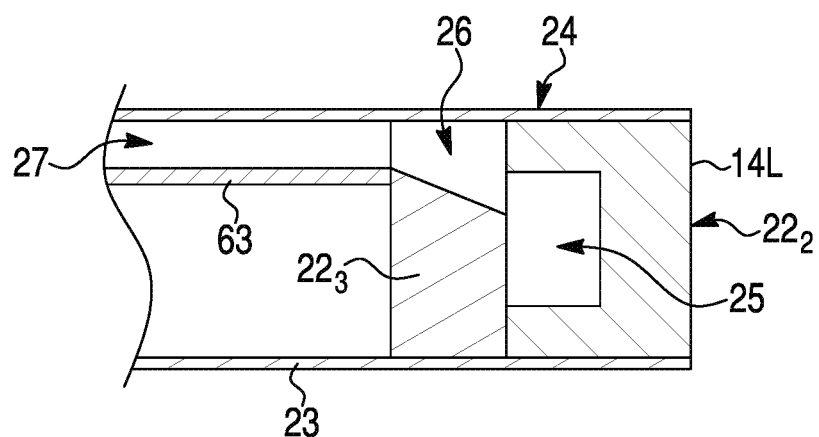
FIGS. 5 and 6 are cross-sectional views of the door according to an alternative exemplary embodiment.

Alternatively, as best shown in FIG. 5, the vertical supply passage 25 may be machined into the second stile 222 as a recess extending vertically therealong. The supply channel 27 extends from the hinge side 14H of the door 14 toward the vertical supply passage 25. The supply channel 27 is formed between the exterior and interior door skins 23 and 24 and an inner strip 63 adjacent to the exterior and interior door skins 23 and 24. The supply channel 27 is connected to the vertical supply passage 25 through a notch 26 formed in the inner stile 223 at the intersection of the vertical supply passage 25 and the supply channel 27. The second stile 222 as illustrated in FIG. 5 may be made of high-density plastic foam, such as PVC, polystyrene, polypropylene, polyurethane or other plastic foam with a specific gravity greater than 0.4.

Figure 6:
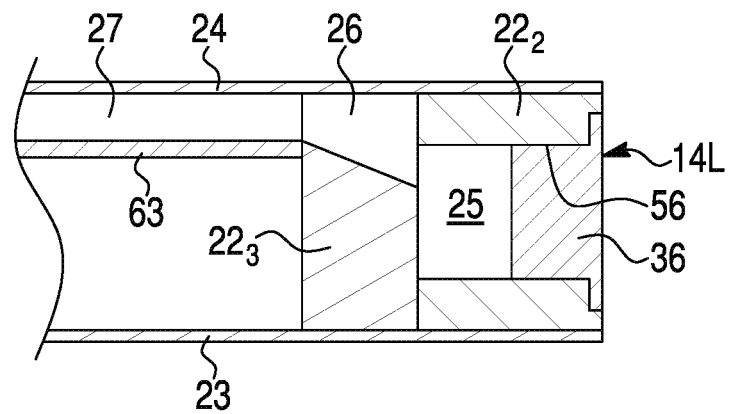

As further shown in FIG. 6, the electric device 36 is inserted into an opening 56 formed in the second stile 222. The low voltage supply electrical wire 44 runs through the supply channel 27, while one of the connecting electrical wires 54 extends through the vertical supply passage 25 and is electrically connected to the electric device 36, thus electrically connecting the electric device 36 to the low voltage AC/DC converter 40. Similarly, the connecting electrical wires 54 are electrically connected to the electric powered door latch 30 and the electric powered door lock 34, thus electrically connecting the electric powered door latch 30 and the electric powered door lock 34 to the low voltage AC/DC converter 40.

Figure 7:
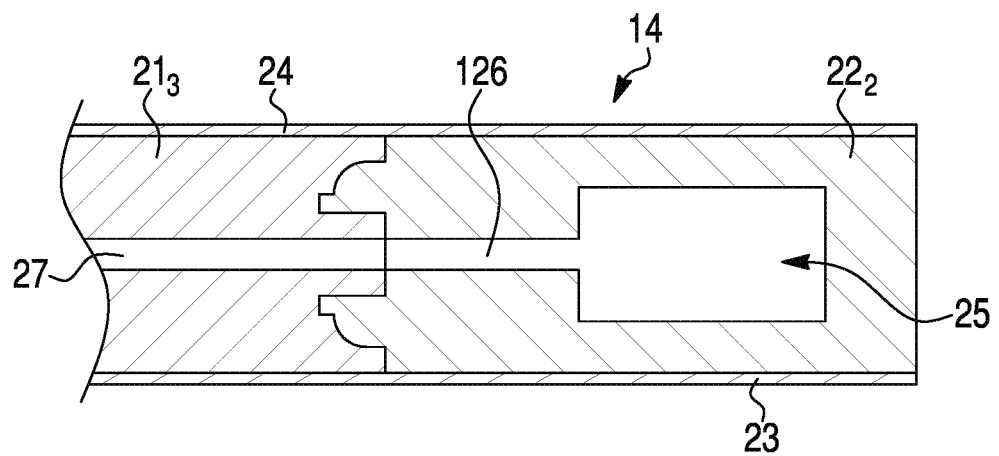
FIG. 7 is a cross-sectional view of a door according to another alternative exemplary embodiment.

Further alternatively, as shown in FIG. 7, the vertical supply passage 25 may be machined into the second stile 222 so as to extend vertically therealong. The supply channel 27 may be machined through the horizontally extending mid-rail 213 and extends from the hinge side 14H of the door 14 towards the vertical supply passage 25. Moreover, the supply channel 27 through the horizontally extending mid-rail 213 is connected to the vertical supply passage 25 through a connecting conduit 126 in the second stile 222. Alternatively, the supply channel 27 is formed through the core 15 of the door 14.

Figure 8:
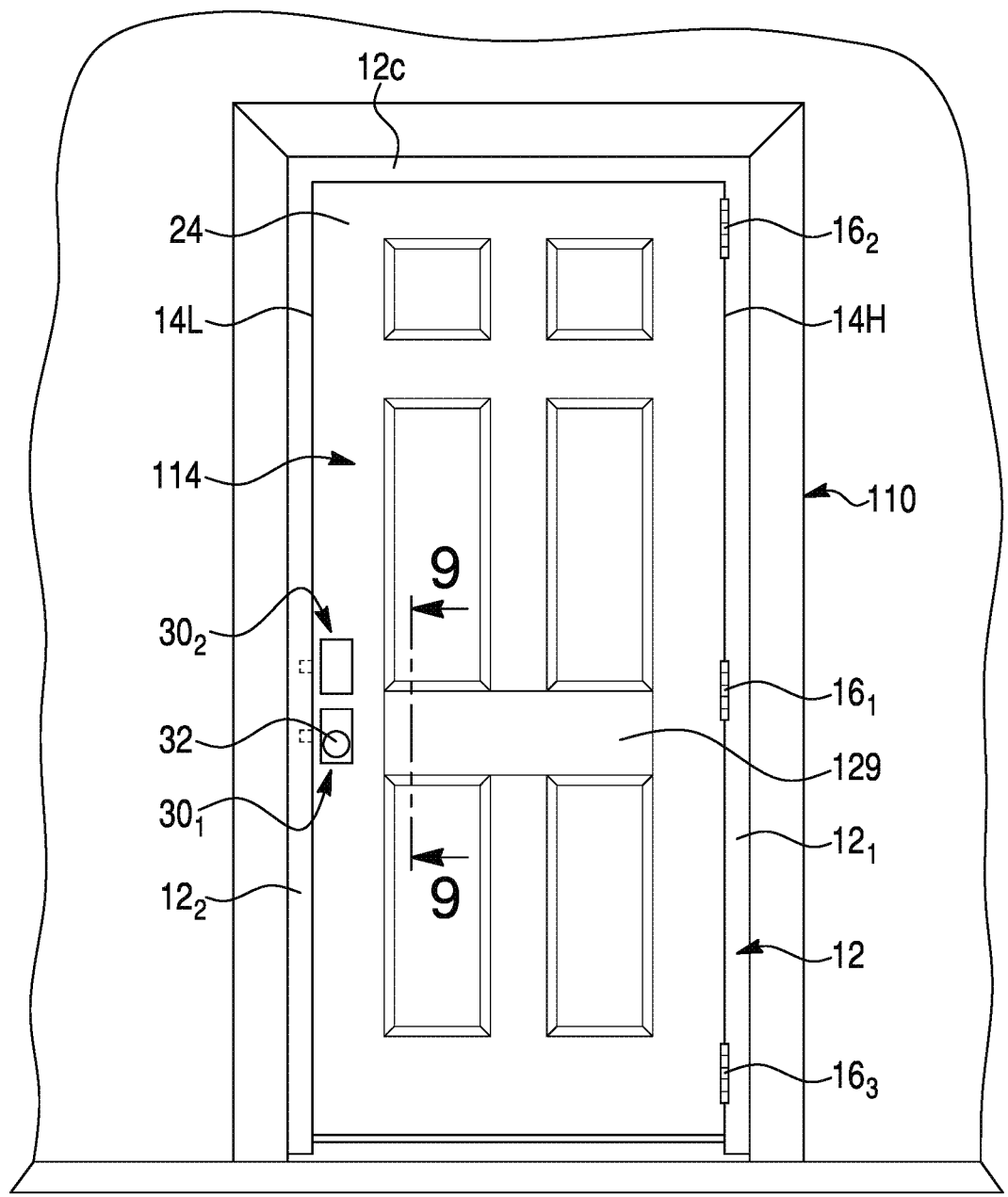
FIG. 8 is an elevational interior view of an exterior door system according to a second exemplary embodiment of the present invention.
Figure 9:
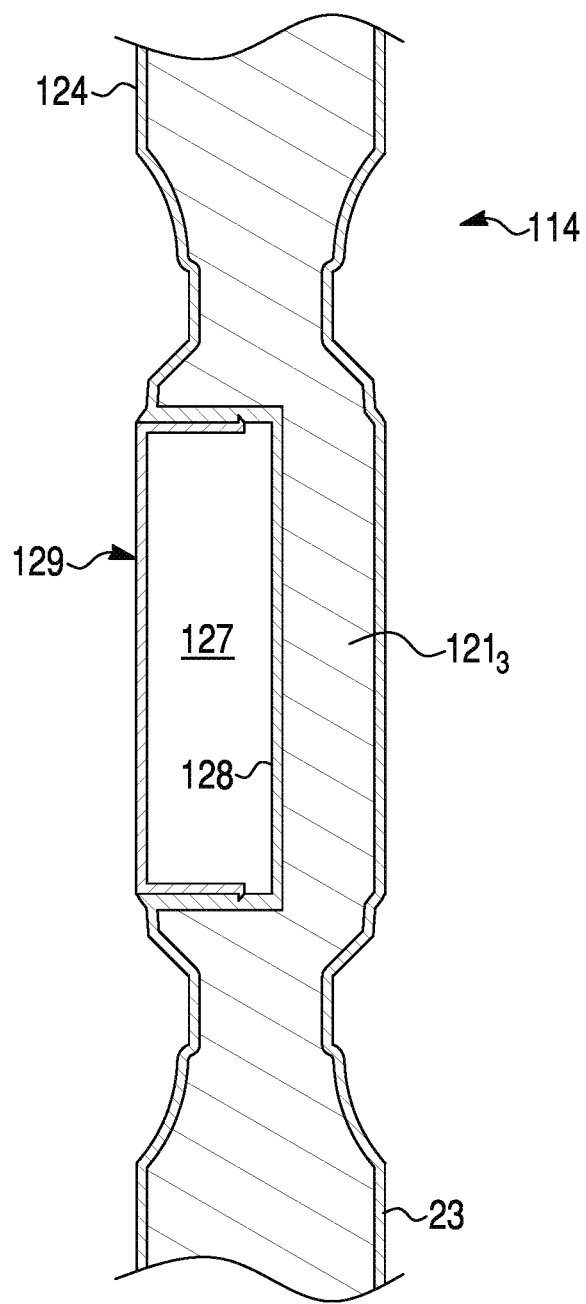
FIG. 9 is a cross-sectional view of the door according to the second exemplary embodiment of the present invention taken along the lines 9-9 in FIG. 8.

FIGS. 8 and 9 illustrate a door system, generally labeled with the reference numeral 110, according to a second exemplary embodiment of the present invention. Components, which function in the same ways as in the first exemplary embodiment of the present invention depicted in FIGS. 1-7 are labeled with the same reference characters. Components, which are constructed similar to or function in the same way as in the first exemplary embodiment are designated by the same reference numerals to which 100 has been added, sometimes without being described in detail since similarities between the corresponding parts in the two embodiments will be readily perceived by the reader.

Figure 10:
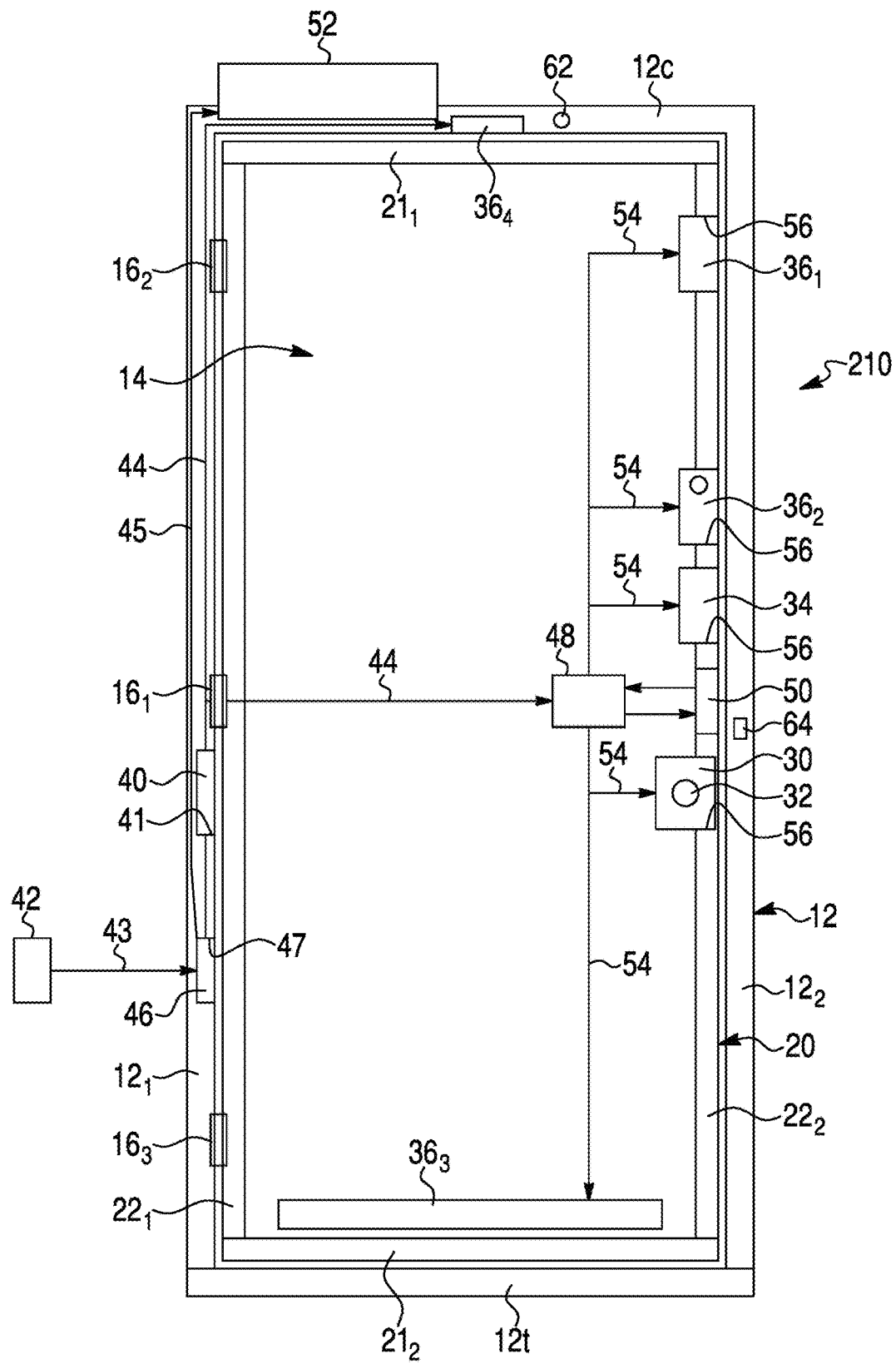
FIG. 10 is an elevational interior view of an exterior door system according to a third exemplary embodiment of the present invention without an exterior door skin.

A door 114 of the door system 110 includes a mid-rail 12$h$, as best shown in FIG. 9. As further illustrated in FIG. 9, an interior door skin 124 and/or the mid-rail 12$h$ is formed with a horizontally extending and exteriorly open groove (or recess) 128 defining a horizontal supply channel 127 receiving the low voltage supply electrical wire 44 therein. The open groove 128 is open to the interior door skin 124 of the door 114, and preferably is covered with a removable cover (or lid) 129. The cover 129 removably snaps into the open groove 128 in the interior door skin 124 of the door 114, or is otherwise removably connected thereto. FIG. 10 illustrates a door system, generally labeled with the reference numeral 210, according to a third exemplary embodiment of the present invention. Components, which function in the same ways as in the first exemplary embodiment of the present invention depicted in FIGS. 1-7 are labeled with the same reference characters. Components, which are constructed similar to or function in the same way as in the first exemplary embodiment are designated by the same reference numerals to which 200 has been added, sometimes without being described in detail since similarities between the corresponding parts in the two embodiments will be readily perceived by the reader.

As illustrated in FIG. 10, the door system 210 comprises a plurality of electric devices 36 integrated into the door assembly 211. Specifically, the door 14 of the door system 210 includes at least four electric devices 361-364 mounted thereto, as illustrated in FIG. 10. The electric devices may include, but are not limited to a video doorbell, a digital camera, LED lighting, etc. It should be understood that the door 14 of the door system 210 according to the present invention may include other electric devices, as there are a number of electric devices marketed to be mounted to doors and provide functions such as electronic access control, door state feedback, entry camera and communication, etc. Moreover, the electric devices 361-364 are typically low-voltage DC electric devices operated by low voltage DC electrical power (such as 5 volts (V), 24 volts or other required voltage).

The electric devices that may be mounted to the door system 210 include, but are not limited to, an electric powered door latch 30, an electric powered door lock 34, a video doorbell 36$i$, a digital camera 362, a threshold LED light 363 and a hallway illumination light 364, ambient light sensor, and motion detector 62, as best illustrated in FIG. 10. The electric powered door latch 30 and the electric powered door lock 34 are mounted to the inner door frame 20 of the door 14, while the video doorbell 36$i$, the digital camera 362 and the threshold LED light 363 may be mounted to the door frame 12 or to the door 14 of the door system 210. The threshold LED light 363 may illuminate when an authorized person is recognized or when a person approaches the door 14.

Similarly, one or more sensors may be provided to not only turn-on the LED light(s) 363 but allow the electric powered door lock 34 to lock after determining that the individual has passed through the door 14 and the 14 door is closed, to communicate with a smartphone app to allow the owner to monitor activity around the door 14, to determine the status of the door 14, whether open or closed, and to determine whether someone is approaching the door 14. It should be understood that the door assembly 211 according to the present invention may include other electric devices. In the interest of simplicity, the following discussion will sometimes use a reference numeral without a subscript numeral to designate an entire group of the electric devices. For example, the reference numeral 36 will be sometimes used when generically referring to the electric devices 361-364.

During the installation of the digital camera 362, the exterior door facing 23 is drilled, preferably at a predetermined place, for exposing a lens of the digital camera 362. The digital camera 362 may be fixed to the exterior door facing 23 by a bezel (not shown) when the digital camera 362 is received in the corresponding slot 56. Moreover, the bezel preferably prevents humidity, moisture, water or rain penetration inside the door 14 and may also serve to harden the digital camera 362 in order to minimize tampering, for example.

Moreover, the door system 210 comprises an electric powered door latch 30 operated at low voltage DC electrical power, and a powered door closer (or electric power door operator) 52 mounted to the frame assembly 12 and operated by high voltage AC electrical power, such as 120 volts. Alternatively, the electric door operator 52 may be also operated at low-voltage DC electrical power. The electric powered door latch 30 may have a lighted doorknob 32 and a lighted keyhole, which illuminate, such as when an authorized person is recognized.

As best illustrated in FIG. 10, the door system 210 further comprises an AC distribution unit 46 mounted to the door frame 12. According to the third exemplary embodiment of the present invention, the AC distribution unit 46 preferably is located in a pocket (or slot) 47 machined or otherwise formed into the first jamb member 12$i$ of the door frame 12 so that the AC distribution unit 46 is accessible from outside of the first jamb member 12$i$ and removably mounted in the pocket 47. The AC distribution unit 46 may be located at a location on frame 12 other than on first jamb member 12$i$. As noted above, the first jamb member 12$i$ is adjacent to the hinges 16 and the first stile of the door frame 20, i.e., adjacent to the hinge side 14H of the door 14. Alternatively, the AC distribution unit 46 may be located in a pocket (or slot) machined or otherwise formed into the upper jamb rail member 12$c$ of the frame assembly 12. Further alternatively, the AC distribution unit 46 may be disposed outside the door assembly 11.

The AC distribution unit 46 is electrically connected to a 120 (or 115) V AC power unit 42 installed during home construction. The AC distribution unit 46 also is electrically connected to a low voltage AC to DC (AC/DC) converter 40 located in a pocket (or slot) 41 machined into the first jamb member 12$i$ of the frame assembly 12, which is adjacent to the hinges 16 and the first stile of the inner door frame 20, i.e., adjacent to the hinge side 14H of the door 14. In this way, the 120 V AC power is distributed by the AC distribution unit 46 and to the low voltage AC/DC converter 40 mounted in the door frame 12, and to at least one other electric device mounted into or on the door frame 12, such as the powered door closer 52, through a high-voltage supply wire 45, shown in FIG. 10.

Low-voltage supply electrical wires 44 run from the low-voltage AC/DC converter 40 to one of the hinges 16*i*, 162, 163 or, alternatively, through an electric power transfer device 18. Preferably, the low voltage supply electrical wires 44 run to and through the hinge 161 disposed in the middle of the first jamb member 12*i* of the door frame 12 and define a powered (or electrical) hinge that conducts the low voltage electrical power. The low voltage supply electrical wires 44 transfer low-voltage DC electrical power across the powered hinge 161. The low-voltage supply electrical wires 44 are connected to the powered hinge 161 on the hinge side 14H of the door 14 and runs to the DC power distribution system 48. Low-voltage DC electrical power is delivered from the distribution system 48 to the electric powered door latch 30 and the electric devices 361-363 that are mounted to the door 14. Moreover, the low-voltage DC electrical power is delivered from the low-voltage AC/DC converter 40 directly to the low-voltage electric device 364 that is mounted to the frame assembly 12 by the low-voltage supply electrical wires 44 so as to bypass the DC power distribution system 48, as shown in FIG. 10.

As illustrated in FIG. 10, the door assembly 210 further comprises a low-voltage backup battery (or battery pack) 50 mounted to the door 14, such as to the inner door frame 20. According to the third exemplary embodiment, the back-up battery 50 slides into a pocket formed into one of the stiles (e.g., the second stile 222) of the inner door frame 20. The battery 50 is electrically connected to the DC power distribution system 48. The battery 50 has a low nominal voltage (such as 5 volts (V), 24 volts or other required voltage). The nominal voltage of the battery 50 corresponds to an output voltage of the low voltage AC/DC converter 40. The door system 210 is powered and operated by the electrical power of the battery 50 as a secondary back-up electrical power source for the powered door latch 30 and the electric devices 361-364. Preferably, the battery 50 is also connected to the DC power distribution system 48 for back-up as well as to provide additional amperage for momentary, high amperage devices such as the powered door latch 30. Preferably, the battery 50 is a rechargeable battery that is charged from the DC power distribution system 48. Thus, in the door system 210, the reliance on batteries as a primary power source is less important, or if a battery option is used, a larger consolidated battery 50 may be stored in the door 14 and not in each of the electric devices.

Figure 11:
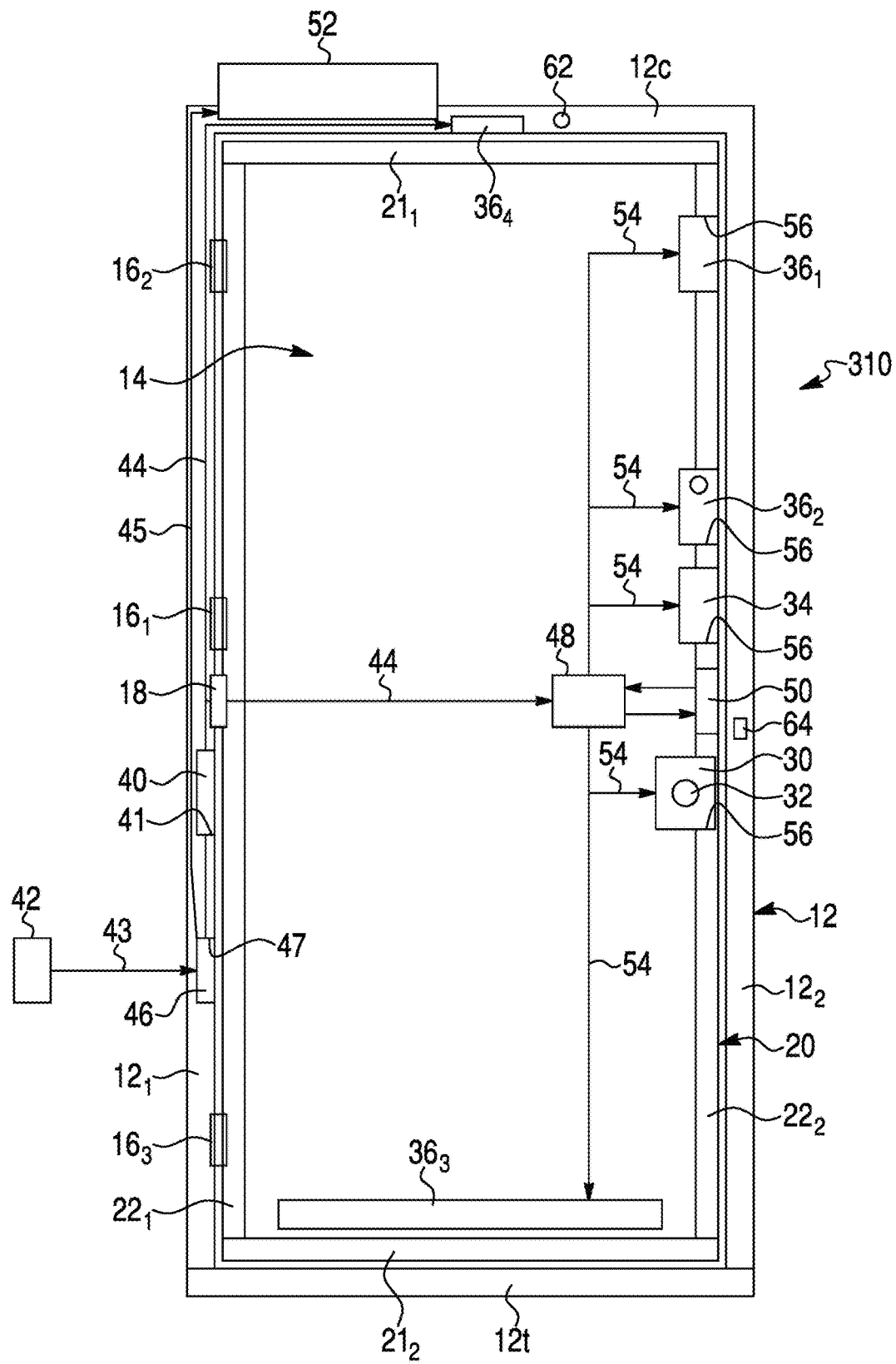
FIG. 11 is an elevational interior view of an exterior door system according to a fourth exemplary embodiment of the present invention without an exterior door skin.

FIG. 11 illustrates a door system, generally labeled with the reference numeral 310, according to a fourth exemplary embodiment of the present invention. Components, which function in the same ways as in the third exemplary embodiment of the present invention depicted in FIG. 10 are labeled with the same reference characters. Components, which are constructed similar to or function in the same way as in the first exemplary embodiment are designated by the same reference numerals, sometimes without being described in detail since similarities between the corresponding parts in the two embodiments will be readily perceived by the reader.

As illustrated in FIG. 11, the door system 310 comprises a plurality of electric devices 36 integrated into the door system 310. Specifically, the door 14 of the door system 310 includes at least four electric devices 361-364 mounted thereto, as illustrated in FIG. 11. The electric devices may include, but are not limited to a video doorbell, a digital camera, LED lighting, etc. It should be understood that the door 14 of the door system 310 according to the present invention may include other electric devices, as there are a number of electric devices marketed to be mounted to doors and provide functions such as electronic access control, door state feedback, entry camera and communication, etc. Moreover, the electric devices 361-364 are typically low-voltage DC electric devices operated by low voltage DC electrical power (such as 5 volts (V), 24 volts or other required voltage).

The AC/DC converter 40 is electrically connected to the door 14 through an electric power transfer device 18. According to the fourth embodiment of the present invention, a low voltage supply electrical wire 44 runs from the low voltage AC/DC converter 40 to the electric power transfer device 18. The electric power transfer device 18 according to the fourth embodiment of the present invention is disposed outside any of the hinges 16*i*, 162, 163 and is configured to transfer low voltage electrical power from the door frame 12 to the pivotable door 14. The low voltage supply electrical wire 44 passes from the low voltage AC/DC converter 40 in the first jamb member 12*i* of the door frame 12 to the pivotable door 14 bypassing any of the door hinges 161, 162, 163. Exemplary electric power transfer devices are disclosed in U.S. Pat. Nos. 3,848,361, 4,445,299, 6,350,956, 6,812,407, 8,448,382, 8,505,169 and 9,825,443, the complete disclosures of which are incorporated herein by reference.

The electric devices that may be mounted to the door system 310 include, but are not limited to, an electric powered door latch 30, an electric powered door lock 34, a video doorbell 36*i*, a digital camera 362, a threshold LED light 363 and a hallway illumination light 364 with a motion detector 62, as best illustrated in FIG. 11. The threshold LED light 363 may illuminate when an authorized person is recognized or when a person approaches the door 14. Similarly, one or more sensors may be provided to not only turn-on the LED light(s) 363 but allow the electric powered door lock 34 to lock after determining that the individual has passed through the door 14 and the door 14 is closed, to communicate with a smartphone app to allow the owner to monitor activity around the door 14, to determine the status of the door 14, whether open or closed, and to determine whether someone is approaching the door 14. The sensors may be mounted to the door 14, to the frame 12, or adjacent to the frame 12. The sensors may communicate wirelessly with a controller located in door 14. Alternatively, a wired connection from AC/DC converter 40 may be provided to allow power to be provided to the sensors and to allow the sensors to transmit data as needed.

120 V AC electrical power can also be connected to the door 14 from the AC distribution unit 46 if AC voltage is needed in the door 14. The door 14 can be constructed with multiple prewired receptacles where electric devices and/or the battery can simply be plugged into an edge of the door 14 and a cover plate installed to enclose the electric devices. Ventilation preferably is provided in the cover plate to aid in heat transfer, or a conduit may be connected to the receptacles and vent air out a top of the door 14.

Figure 12:
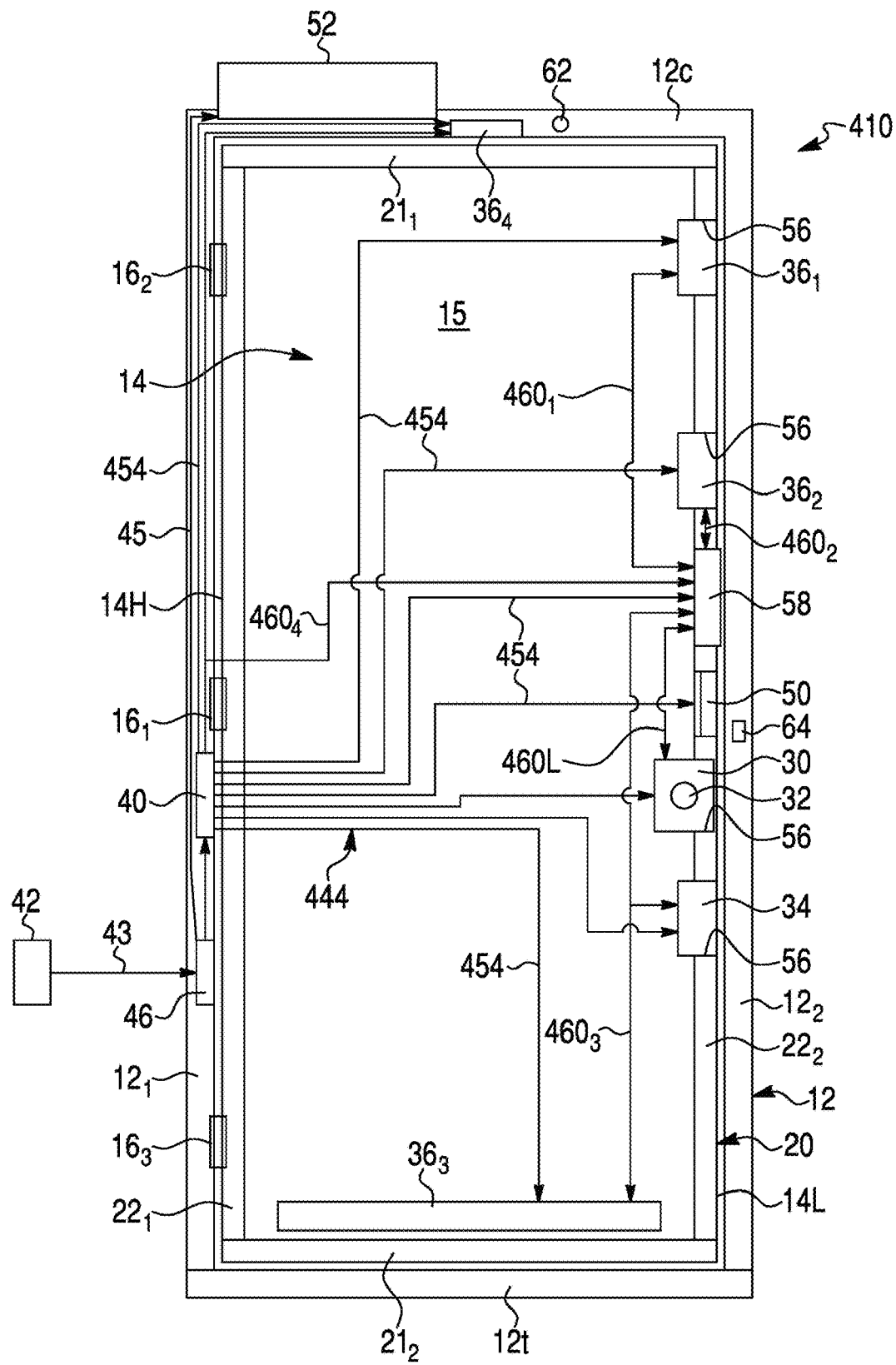
FIG. 12 is an elevational interior view of an exterior door system according to a fifth exemplary embodiment of the present invention without an exterior door skin.

FIG. 12 illustrates a door system, generally labeled with the reference numeral 410, according to a fifth exemplary embodiment of the present invention. Components, which function in the same ways as in the third exemplary embodiment of the present invention depicted in FIG. 10 are labeled with the same reference characters. Components, which are constructed similar to or function in the same way as in the first exemplary embodiment are designated by the same reference numerals, sometimes without being described in detail since similarities between the corresponding parts in the two embodiments will be readily perceived by the reader.

As illustrated in FIG. 12, the door system 410 comprises a plurality of DC electric devices 36 integrated into the door system 410. The electric devices that may be mounted to the door system 410 include, but are not limited to, an electric powered door latch 30, an electric powered door lock 34, a video doorbell 36i, a digital camera 362, a threshold LED light 363 and a hallway illumination light 364 provided with a motion sensor (or motion detector) 62 or a proximity sensor mounted to the frame assembly 12, as best illustrated in FIG. 12. The threshold LED light 363 illuminates, such as when an authorized person is recognized. Some of the DC electric devices, such as the video doorbell 36i, the digital camera 362, the threshold LED light 363, may be mounted to the door frame 12 or to the door 14.

It should be understood that the door 14 of the door system 410 according to the present invention may include other electric devices, as there are a number of electric devices marketed to be mounted to doors and provide functions such as electronic access control, door state feedback, entry camera and communication, etc. Moreover, the electric devices 30, 34, 361-364 are typically low-voltage DC electric devices operated by low voltage DC electrical power (such as 5 volts (V), 24 volts or other required voltage).

The AC/DC converter 40 is electrically connected to the door 14 by a plurality of low voltage connecting electrical wires 454 run from the low voltage AC/DC converter 40 to the electric power transfer device, such as one of the hinges 16i, 162, 163. The connecting electrical wires 454 together define an electrical wire system. According to the fifth exemplary embodiment, the electrical wire system is in the form of a wire harness 444 electrically connected to the AC/DC converter 40 and to the DC electric devices 30, 34 and 36.

As illustrated in FIG. 12, the door 14 of the door assembly 410 further comprises a central electronic control unit (ECU) (or power management controller) 58 configured to be programmed to receive input from one or more sensors, such as the motion sensor (or motion detector) 62 (may be in wireless communication with the central ECU 58), a proximity sensor, or a smoke detector. ECU 58 may also send commands to the electric devices 361-364, the electric powered door latch 30, and also to the homeowner. The ECU 58 preferably is an electronic controller having firmware and/or associated software suitable for assuring operation of the ECU and its interaction with the electric devices 36 and associated sensors, if any. Preferably, the battery 50, the power management controller 58, the sensor(s), the electric powered door latch 30 and/or at least some of the electric devices are mounted into the edge of the latch side 14L of the door 14 in the prewired receptacles for integration, modularization and serviceability. Alternatively, at least some of these devices, such as the power management controller 58, may be mounted to the door fame 12.

The central ECU 58 controls the electric powered door latch 30 and the electric devices 361-364. Accordingly, the central ECU 58 is in communication with the electric powered door latch 30, the electric powered door lock 34 and the electric devices 361-364, such as through ethernet communication including data and/or signal links 460i, 4602, 4603, 4604 and 460L. As best shown in FIG. 12, the data links 4604 and 460L extend through the wire harness 444. Preferably, the data links are in the form of a data bus that provides transportation for data and/or control signals going both ways. Alternatively, the central ECU 58 may be in communication with the electric powered door latch 30 and the electric devices 361-364 through one of the following wireless technologies: Bluetooth®, Wi-Fi, LAN, mobile telecommunications technology (3G, 4G or 5G), etc.

The central ECU 58 also controls the electric powered door latch 30 and the electric powered door lock 34. The electric powered door latch 30 includes an electric latch operator, which may be used to lock the door 14 based upon input signals received from the central ECU 58. The central ECU 58 may allow the electric powered door latch 30 to be unlatched without the intervention of a user. To unlatch the door 14, the electric latch operator moves the central latch bolt 33 of the electric powered door latch 30 by an electric motor associated with the electric latch operator of the electric powered door latch 30 into the retracted position. Thus, the power management controller 58 with the data links 460i, 4602, 4603, 4604 and 460L defines a power management system for the door assembly 10. In other words, the power management controller 58 is operable to control power to each of the DC electric devices 30, 34 and 36, receive data from each of the low-voltage DC electric devices 30, 34 and 36, and to provide a control signal to each of the DC electric devices 30, 34 and 36. The door assembly 410 can be configured by a user to enable both local and cloud integration and data storage. While we prefer the ECU 58 to be integrated into door 14, it may be located adjacent door 14, such as on frame 12, or adjacent frame 12.

Moreover, the door system 410 comprises a powered door closer (or electric power door operator) 52 mounted to the frame assembly 12 and operated by high voltage AC electrical power 120 volts, and a door sensor 64 (in wireless communication with the central ECU 58) configured to determine the state of the door 14 (open or closed). Alternatively, the electric door operator 52 may be also operated at low-voltage DC electrical power.

According to the third exemplary embodiment, the AC powered door closer 52 and the door sensor 64, such as a Hall-effect sensor, interact to close the door 14 when the door sensor 64 determines that the door 14 is open. It should be understood that capabilities of the door sensor 64 may contemplate various "states" of the door or the door devices, i.e., locked/unlocked, open/closed, lights on/off, etc, but should also sense problems with the DC or AC electric devices themselves, for example, no WiFi or Bluetooth signal, too much power draw, not enough power draw, too hot, too cold, (for a back-up battery 50, for example), etc. The door sensor(s) 64 communicate a signal to ECU 58, which then determines the action to take in response to the signal and issues a command to the appropriate electric device. In this way, the door sensor 64 may send a signal to ECU 58 that the door 14 is open, and the ECU 58 may issue a command to door closer 52 to operate to close the door. The door open signal may be communicated by the door sensor 64, such as on a periodic basis, but may be in response to an inquiry, such as from the owner through use of a smartphone app.

Figure 13:
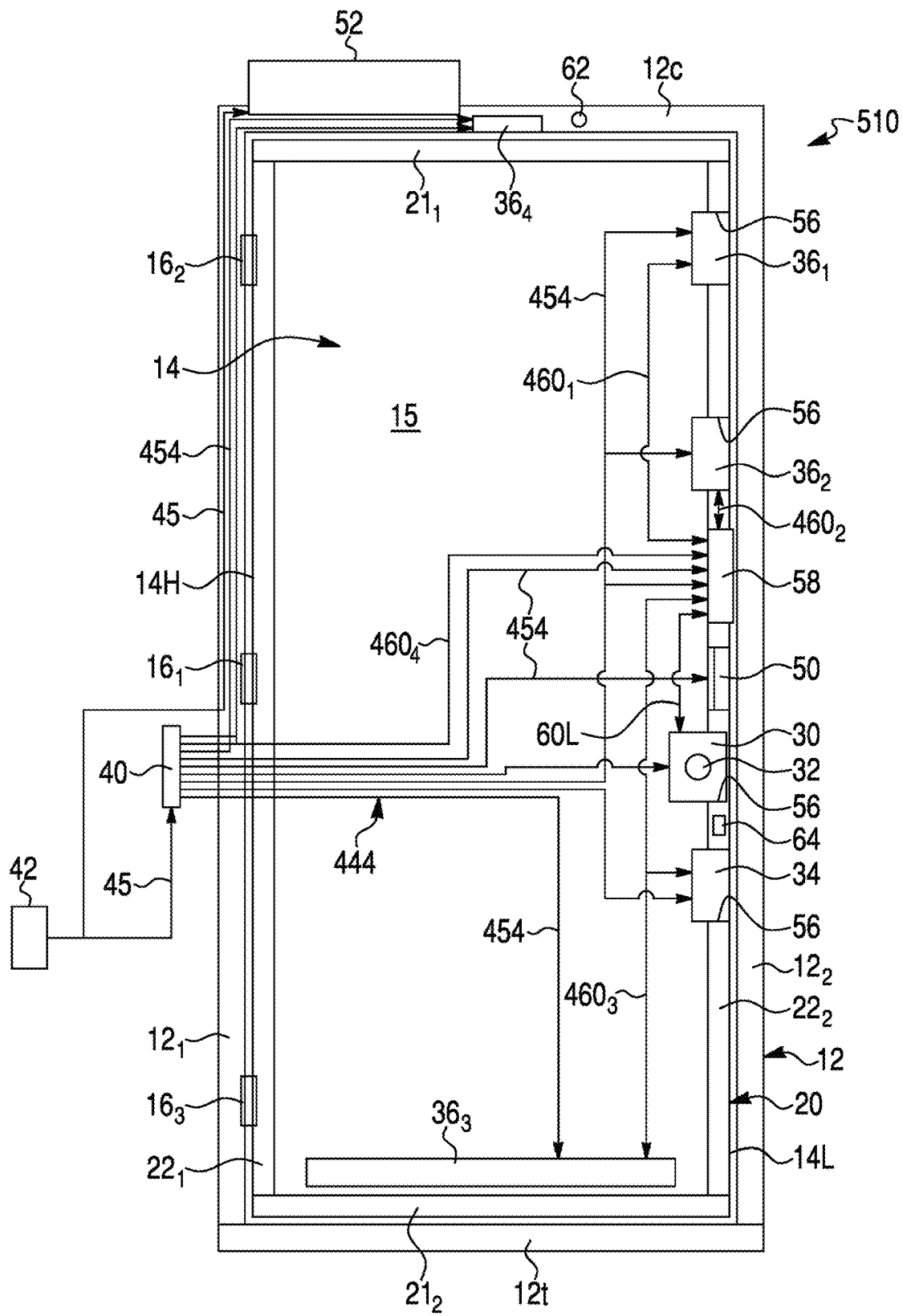
FIG. 13 is an elevational interior view of an exterior door system according to a sixth exemplary embodiment of the present invention without an exterior door skin.

FIG. 13 illustrates a door system, generally labeled with the reference numeral 510, according to a sixth exemplary embodiment of the present invention. Components, which function in the same ways as in the third exemplary embodiment of the present invention depicted in FIG. 12 are labeled with the same reference characters. Components, which are constructed similar to or function in the same way as in the first exemplary embodiment are designated by the same reference numerals, sometimes without being described in detail since similarities between the corresponding parts in the two embodiments will be readily perceived by the reader.

As illustrated in FIG. 13, the low voltage AC/DC converter 40 is disposed outside the door assembly 11, specifically outside the door frame 12. Moreover, the AC/DC converter 40 is electrically connected to the DC electric devices 30, 34 and 36 by a wire harness 444.

Figure 14:
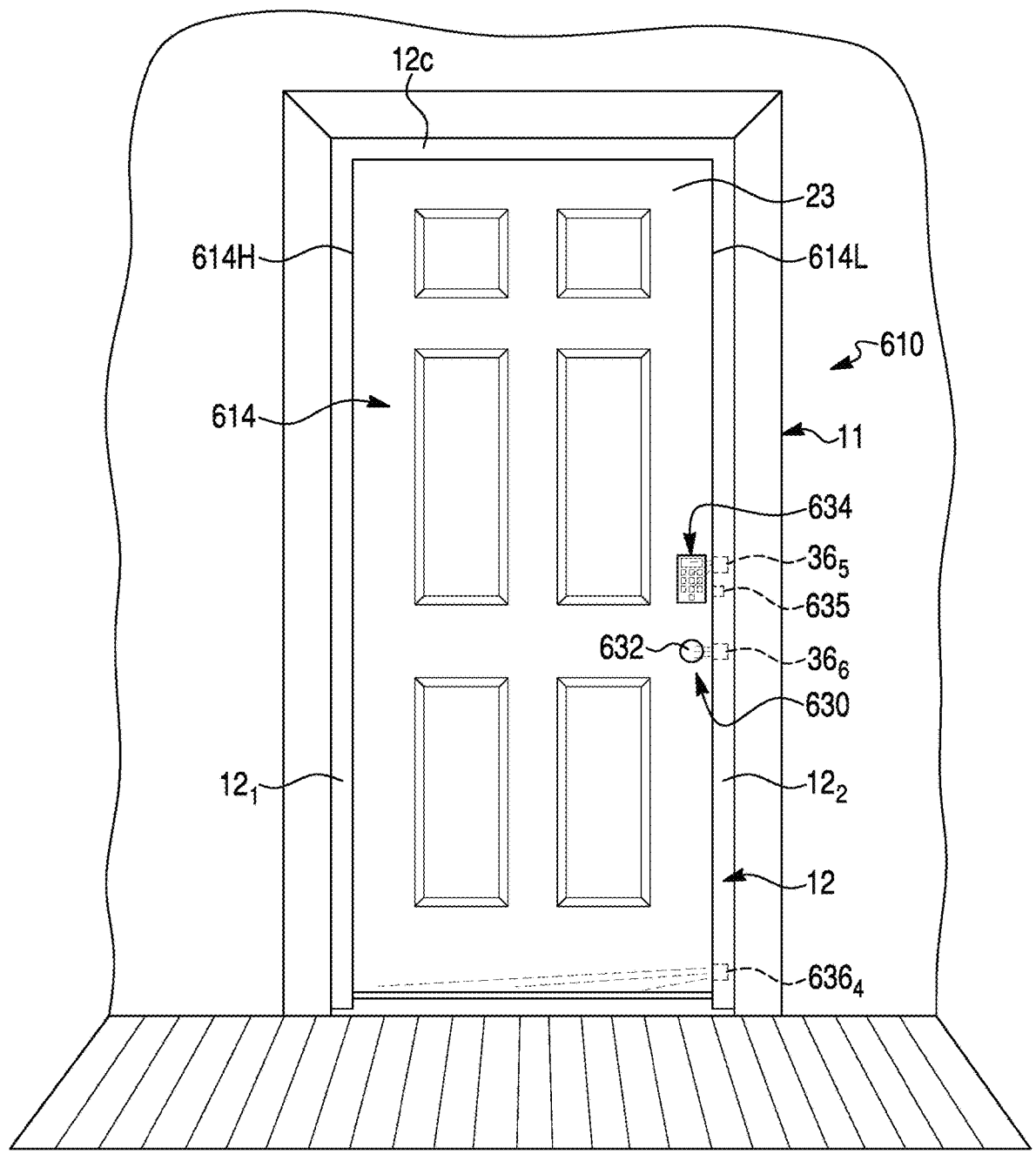
FIG. 14 is an elevational exterior view of an exterior door system according to a seventh exemplary embodiment of the present invention.
Figure 15:
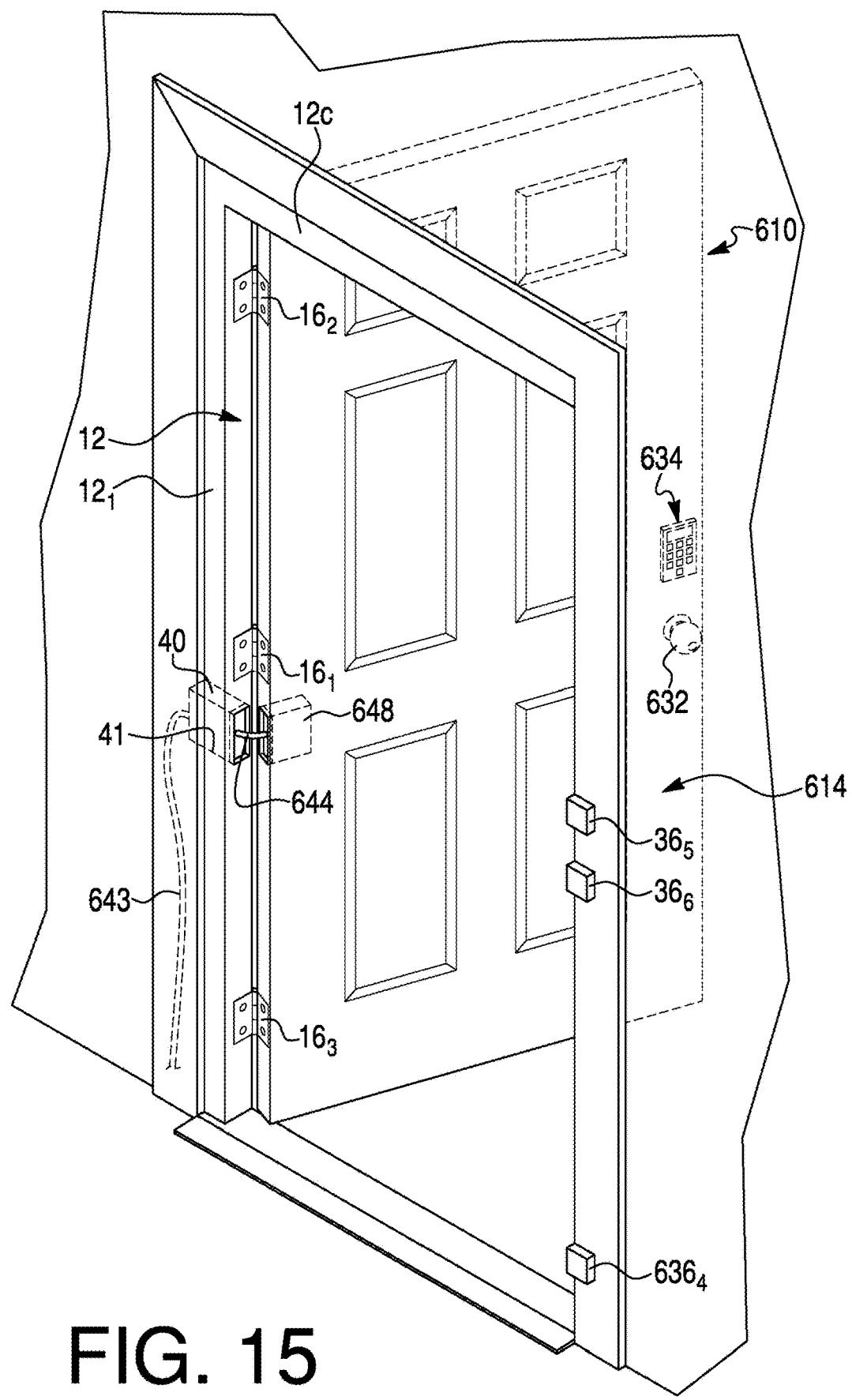
FIG. 15 is a perspective view of the exterior door system according to the seventh exemplary embodiment of the present invention with an open door.

FIGS. 14 and 15 illustrate a door system, generally labeled with the reference numeral 610, according to a seventh exemplary embodiment of the present invention. Components, which function in the same ways as in the third exemplary embodiment of the present invention depicted in FIG. 12 are labeled with the same reference characters. Components, which are constructed similar to or function in the same way as in the prior exemplary embodiments are designated by the same reference numerals or by the reference numerals to which 600 has been added, sometimes without being described in detail since similarities between the corresponding parts in the two embodiments will be readily perceived by the reader.

As illustrated in FIGS. 14 and 15, the door system 610 comprises a substantially rectangular door frame 12 and a door 614 pivotally attached thereto by at least one hinge 16i, such as "butt hinge" that includes two leaves. Preferably, the door system 610 comprises three hinges 16i, 162, 163 used to pivotally attach the door 614 to the door frame 12. The door system 610 further comprises a plurality of DC electric devices (components) integrated into the door system 610. The DC electric devices are mounted to the door 614 or to the door frame 12 of the door system 610 to provide functions, such as electronic access control, door state feedback, entry camera and audio/video communication, etc. Specifically, the DC electric devices that are mounted to the door 614 of the door system 610 include, but are not limited to, a keypad electronic door lock 634 with a deadbolt 635, while the DC electric devices that are mounted to the door frame 12 or even adjacent to the frame 12 on a wall of the building include, but are not limited to, a threshold illumination light 6364, a door lock illumination light 36s, and a doorknob illumination light 366 for illuminating a doorknob (or handle) 632 of a manual or electric powered door latch 630. While the lights 6364, 36s, and 366 are shown mounted to the exterior of frame 12, they may be mounted in pockets formed into the frame 12 in order to be recessed and not easily accessible, such as to an intruder. As illustrated in FIG. 15, the door system 610 further comprises a low voltage (such as 5 volts (V), 12 volts, 24 volts or other required voltage) AC/DC converter 40 mounted to the door frame 12. Alternatively, the low voltage AC/DC converter 40 may be disposed outside the door assembly 11, such as at the wall adjacent the frame 12. According to the present invention, as best illustrated in FIG. 15, the low voltage AC/DC converter 40 is located in a pocket (or slot) 41 machined or otherwise formed into the first jamb member 12i of the door frame 12 so that the low voltage AC/DC converter 40 is accessible from outside of the first jamb member 12i of and removably mounted in the pocket 41. The low voltage AC/DC converter 40 is electrically connected by high voltage electrical cable 643 to a 115 (or 120) V AC power unit installed during home construction and located outside the door system 610.

Further according to the seventh exemplary embodiment, the AC/DC converter 40 is electrically connected to a DC power distribution system 648 by an electric power transfer device including an armored cable 644 provided to transmit low voltage DC power, data, electric signals, or a combination thereof. Preferably the pockets in which the AC/DC converter 40 and the distribution system 648 are positioned are sized sufficiently to allow the armored cable 644 to be retained between them when the door 14 is closed and do not impede closing of the door 614.

A door assembly according to the present invention includes a power system that has the ability to provide both high-voltage and low-voltage electrical power for operation of a plurality of the electric devices integrated into the door assembly. For the plurality of the electric devices integrated in the door assembly, the range of watts required, considering amperes and volts specifically required by each of the electric devices and use, varies widely from LED lighting at the low end, 2.9 watts per foot at 5 volts, to electromechanical door systems requiring extremely high amp output to move a door, typically over 500 watts at 120 volts. Thus, the present invention provides two or more power supply options that better match power needs of electric devices to allow for easier integration and power management given the diversity of power requirements.

In the door system 10, 110, 210, 310, 410, 510 or 610, a user may access the power system of the door system 10, 110, 210, 310, 410, 510 or 610 via a wireless connection and a PC or mobile device, such as through a smartphone app, to set up, configure and manage one or more power connected electric devices 36. The smartphone app may be used to monitor activity around the door, to activate the electric powered door lock 34 to lock and unlock, and to determine the status of the door, whether open or shut. Moreover, a user may access data and have user settable options for both addition of electric devices as well as the diagnostic health of the attached electric devices and/or the battery that would be a more efficient method to service issues occurred with the electric devices and the battery.

By providing a convenient way to integrate the electric devices (hardware) into the door assembly with power available, manufacturers of the electric devices can simplify the designs and provide consumers with cleaner designs that are hidden and integrated into the door and do not require replacement of batteries. Furthermore, the invention enables integration of the electric devices into the door assembly in a standardized way that allows convenient serviceability of the electric devices.

The electric devices are integrated into the door assembly according to the present invention so that the door maintains structural integrity, insulation performance, and is free of distortion or other aesthetic defects.

The foregoing description of the exemplary embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method of operating an entry system, comprising:
providing a door frame mounted within an entryway;
providing a door pivotally attached to the door frame;

providing an AC/DC converter in or on a portion of the door frame with an AC power unit operably associated with the door frame and electrically connected to the AC/DC converter to generate DC power;

providing a DC power distribution system operably associated with the door and electrically connected to the AC/DC converter;

providing a plurality of DC electric devices mounted to the door and electrically connected to the AC/DC converter through the DC power distribution block; and providing a power transfer device interconnecting the AC/DC converter and the DC power distribution block.

2. The method in accordance with claim 1, wherein the door frame includes a pair of parallel, spaced apart first and second jamb members, and a horizontally extending jamb rail member, wherein the AC/DC converter is mounted to one of the jamb members or the jamb rail member, and wherein the AC power unit is proximate one of the jamb members or the jamb rail member.

3. The method in accordance with claim 1, wherein the door frame includes a pair of parallel, spaced apart first and second jamb members, and a horizontally extending jamb rail reminder, and wherein the AC/DC converter is mounted in or on one of the jamb members or the jamb rail member.

4. The method in accordance with claim 3, wherein the AC power unit is proximate of the jamb rail member.

5. The method in accordance with claim 1, wherein the DC electric devices include at least one of a powered lock, a video camera, and LEDs.

6. The method in accordance with claim 5, wherein the DC power distribution system includes an electric wire system, and wherein the electric wire system is in electrical communication with the AC/DC converter and each of the DC electric devices.

7. The method in accordance with claim 6, further comprising a power management controller, wherein the power management controller is mounted to the door and interfaces with the DC power distribution system and the DC electric devices.

8. The method in accordance with claim 7, wherein the power management controller is adapted to provide DC power to the DC electric devices, receive data from the DC electric devices and to send commands to the DC electric devices.

9. The method in accordance with claim 8, wherein the electrical wire system includes a wire harness having a plurality of electric wires.

10. The method in accordance with claim 6, wherein the electrical wire system includes a wire having a plurality of electric wires.

11. The method in accordance with claim 1, wherein the electric power transfer device includes one of a power hinge, an armored cable, and an electrical wire system.

12. The method in accordance with claim 11, wherein the electrical wire system has first and second ends, and wherein the first end is connected to the AC/DC converter and the second end is connected to the door.

13. The method in accordance with claim 1, further comprising a sensor operably associated with the door frame, wherein the sensor is configured to interact with at least one of the DC electric devices.

14. The method in accordance with claim 13, further comprising an AC electric device operably associated with the door, wherein the AC electric device is electrically connected with the AC power unit.

15. The method in accordance with claim 14, wherein the sensor determines the state of the door, wherein the AC electric device is a powered door closer, and wherein the sensor and the powered door closer interact to close the door when the sensor determines that the door is open.

16. The method in accordance with claim 15, wherein the sensor is a Hall-effect sensor, the method further comprising:

providing an electric power operating mechanism pivotally mounted to the door frame;

positioning a source of AC power proximate the door frame;

generating DC power by rectifying and reducing the voltage of the AC power, and supplying low-voltage DC power to the door;

positioning at least one DC electric device on the door; and operating the DC electric device.

* * * * *